US012358776B2

(12) United States Patent
Lloveras et al.

(10) Patent No.: US 12,358,776 B2
(45) Date of Patent: Jul. 15, 2025

(54) METHOD FOR REFILLING A CONTAINER WITH A DISPENSING PUMP AND CORRESPONDING REFILLING CARTRIDGE, AND MACHINE

(71) Applicant: ORIENT EXPRESS INT'L LTD, Hong Kong (CN)

(72) Inventors: Xavier Lloveras, Andorra la Vella (AD); Eduard Bonifacio, Barcelona (ES); Nil Lloveras, Barcelona (ES); Roc Lloveras, Barcelona (ES)

(73) Assignee: ORIENT EXPRESS INT'L LTD., Hong Kong (CN)

( * ) Notice: Subject to any disclaimer, the term of this patent is extended or adjusted under 35 U.S.C. 154(b) by 136 days.

(21) Appl. No.: 18/268,412

(22) PCT Filed: Dec. 21, 2021

(86) PCT No.: PCT/IB2021/062102
§ 371 (c)(1),
(2) Date: Jun. 20, 2023

(87) PCT Pub. No.: WO2022/137115
PCT Pub. Date: Jun. 30, 2022

(65) Prior Publication Data

US 2024/0034613 A1 Feb. 1, 2024

(30) Foreign Application Priority Data

Dec. 22, 2020 (EP) .................................... 20383137

(51) Int. Cl.

| | |
|---|---|
| ***B67D 7/02*** | (2010.01) |
| ***B67D 7/38*** | (2010.01) |
| ***B67D 7/58*** | (2010.01) |

(52) U.S. Cl.
CPC ......... *B67D 7/0277* (2013.01); *B67D 7/0294* (2013.01); *B67D 7/38* (2013.01); *B67D 7/58* (2013.01)

(58) Field of Classification Search
CPC ...... B67D 7/0277; B67D 7/0294; B67D 7/38; B67D 7/58
(Continued)

(56) References Cited

U.S. PATENT DOCUMENTS 5,694,991 A * 12/1997 Harris ................. B67D 7/0294 141/351
2007/0205305 A1 9/2007 Vagedes
(Continued)

FOREIGN PATENT DOCUMENTS

DE 4242009 A1 6/1994
DE 4403755 A1 11/1994
(Continued)

OTHER PUBLICATIONS

FR 3034031 A1—English translation (Year: 2017).*
(Continued)

*Primary Examiner* — Craig M Schneider
*Assistant Examiner* — Christopher M Afful
(74) *Attorney, Agent, or Firm* — Tucker Ellis LLP

(57) ABSTRACT

Method for refilling a container with a dispensing pump assembled on its neck, comprising the following steps: [1] positioning the container upside right, and fluidically connecting the interior of a refilling cartridge with a refilling liquid with an air passage present in the pump and that communicates the inner volume of the container with the exterior in a specific position of the piston of the pump, [2] moving the piston until a fluidic communication is established between the interior of the refilling cartridge and the inner volume through the air passage, [3] increasing the pressure to which the liquid in the interior of the refilling cartridge is subjected, thereby causing the passage of part of the liquid to the inner volume, thereby increasing the pres-
(Continued)

sure in the inner volume, [4] reducing the pressure in the interior of the refilling cartridge to a value less than the pressure in the inner volume, thereby allowing air to pass from the inner volume to the interior of the refilling cartridge through the air passage, [5] repeating steps [3] and [4] at least once, [6] disconnecting the refilling cartridge.

16 Claims, 21 Drawing Sheets

(58) Field of Classification Search
USPC .............................................. 141/2, 383, 113
See application file for complete search history.

(56) References Cited

U.S. PATENT DOCUMENTS

2009/0200339 A1* 8/2009 Quinlan ................... A47K 5/16
222/401
2013/0068796 A1 3/2013 Hui et al.
2013/0168468 A1 7/2013 Pellegrino et al.
2020/0197966 A1* 6/2020 Marshall .............. A47K 5/1202

FOREIGN PATENT DOCUMENTS

| | | | |
|---|---|---|---|
| EP | 0265270 | A2 | 4/1988 |
| EP | 0626210 | A1 | 11/1994 |
| FR | 3034031 | A1 * | 9/2016 |
| FR | 3049267 | A1 | 9/2017 |
| WO | 20160203167 | A1 | 12/2016 |
| WO | 2020094163 | A1 | 5/2020 |

OTHER PUBLICATIONS

International Search Report from corresponding International Application No. PCT/IB2021/062102 mailed on Mar. 24. 2023, 3 pages.

* cited by examiner

METHOD FOR REFILLING A CONTAINER WITH A DISPENSING PUMP AND CORRESPONDING REFILLING CARTRIDGE, AND MACHINE

RELATED APPLICATION DATA

This application is a national phase application of International Application No. PCT/IB2021/062102 filed Dec. 21, 2021, which claims priority to European Application No. 20383137.5 filed Dec. 22, 2020. The entireties of the aforementioned applications are incorporated herein by reference.

FIELD OF THE INVENTION

Description

The invention relates to a method for refilling a container, wherein the container has a neck, a bottom, and an inner volume, wherein the container has a dispensing pump assembled on the neck. Preferably the dispensing pump is assembled on the neck in an irreversible manner, i.e., in a manner that does not envisage the user disassembling it and assembling it again on the container. The dispensing pump comprises:

[a] a pump body with:

[a.1] a lower inlet port,

[a.2] a cylindrical inner side surface defining an axial direction,

[a.3] a side port arranged on the inner side surface, and

[a.4] an upper opening, wherein the pump body defines a pumping chamber in the interior thereof, wherein when the pump is in an assembled position, the upper opening protrudes from the neck and the lower inlet port is inside the container, and the side port communicates the inner side surface with the inner volume,

[b] an inlet valve arranged between the inlet port and the pumping chamber, suitable for allowing the entry of liquid in the interior of the pumping chamber through the inlet port and for blocking the exit of liquid in the interior of the pumping chamber through the inlet port,

[c] a suction tube having one end connected to the inlet port and extending towards the bottom,

[d] a pumping piston with

[d.1] a lower portion housed inside the pump body and comprising

[d.1.1] an outer side surface, facing the inner side surface,

[d.1.2] an upper perimetral sealing lip,

[d.1.3] a lower perimetral sealing lip, and

[d.2] an upper portion with evacuation means comprising an outlet port and an outlet valve, arranged between the outlet port and the pumping chamber, suitable for allowing the exit of liquid from the interior of the pumping chamber through the outlet port and for blocking the entry of air in the interior of the pumping chamber through the outlet port,

[e] elastic means suitable for generating a force in the axial direction and prone to separating the piston from the pump body, and

[f] fixing means for fixing the pump in the neck, wherein, during a movement of actuation of the pump, the piston moves according to the axial direction between an expanded position and a retracted position, wherein when the piston is in the retracted position the side port is arranged over the upper perimetral sealing lip and between the piston, the pump body, and the fixing means there is an air passage suitable for establishing a fluidic communication between the exterior of the container and the side port, and when the piston is in the expanded position, the air passage is closed by the upper perimetral sealing lip.

In general, in the present description and claims, it should be understood that when reference is made to a cylindrical surface, this cylindrical surface is a cylindrical surface in the broadest sense, i.e., as any surface generated from the movement of a straight line along a generatrix curve. The particular case in which the cylindrical surface is a circular cylindrical surface (or a cylinder with a circular cross-section) is, however, a preferred option for the present invention.

Another object of the invention is a a refilling cartridge for refilling a container and suitable for housing a liquid to be refilled in the container in the interior of the refilling cartridge, comprising a side wall, a base, and an upper portion. The refilling cartridge according to the invention can be empty of liquid (for example, before being filled) or full of liquid.

Finally, another object of the invention is a machine for performing a method according to the invention.

State of the Art

Containers (for example bottles) with a dispensing pump assembled on the neck thereof are commonly used in a plurality of applications. In particular, containers with a dispensing pump such as the one indicated above are widely known. A common use is for the metering of perfumery, cosmetic, hygiene, and similar products. In specific cases, it is envisaged that the user can unscrew the dispensing pump from the neck of the container and can refill the container. However, in a plurality of cases a refilling of the containers is not envisaged, said containers therefore being conceived as single-use containers. That is particularly the case when the dispensing pump is assembled on the container in a non-removable manner.

It is of interest to offer solutions which allow the refilling of these containers, among others, to prevent the negative ecological impact caused by empty containers, as well as all the accessories used in their decoration, and the actual process of manufacturing same.

U.S. Pat. No. 10,399,103 B2 describes a system of refilling a container having a dispensing pump assembled thereon. To that end, the container is positioned upside down and its air passage is fluidically communicated with the interior of a bottle having the refilling liquid through a filling interface, such that a liquid transfer channel is established. A second channel, that is, a gas discharge channel, which allows the exit of the gas contained in the interior of the container, is also established.

U.S. Pat. No. 9,834,369 B2 describes a method of extracting liquid from a container having a dispensing pump assembled thereon. The method consists of injecting air under pressure into the container and forcing the exit of the liquid through the dispensing pump itself, which has a system of valves that are all open when they have a downstream overpressure.

SUMMARY OF THE INVENTION

It is an object of the invention to offer a system which allows the refilling of containers (preferably bottles) which have a dispensing pump assembled thereon. This purpose is achieved by a method of the type indicated above, characterized in that it comprises the following steps:

[1] positioning the container such that the bottom is in the lower position, and fluidically connecting the interior of a refilling cartridge comprising a refilling liquid with the air passage,

[2] moving the pumping piston from the expanded position, thereby opening the air passage and establishing a fluidic communication between the interior of the refilling cartridge and the inner volume,

[3] increasing the pressure to which the refilling liquid in the interior of the refilling cartridge is subjected, thereby causing the passage of part of the liquid to the inner volume, thereby increasing the pressure in the inner volume,

[4] reducing the pressure to which the refilling liquid in the interior of the refilling cartridge is subjected to a value less than the pressure in the inner volume, thereby allowing part of the air under pressure in the inner volume to pass to the interior of the refilling cartridge through the air passage,

[5] repeating steps [3] and [4] at least once,

[6] disconnecting the refilling cartridge.

The method according to the invention thus uses the air passage existing in the pump both for introducing the liquid in the container and for extracting the air accumulated in the interior of the container. During step [3], the liquid gradually fills the inner volume of the container, but the air in the inner volume of the container cannot exit anywhere because, since the container is "right-side up", i.e., with the bottom in the lower position, the free end of the suction tube is below the free surface of the liquid. Therefore, the pressure in the interior of the container gradually increases and, accordingly, it is also necessary to increase the pressure to which the liquid in the interior of the refilling cartridge is subjected for it to continue flowing towards the inner volume of the container. To prevent the pressure from increasing to unwanted values, the filling of the container is interrupted by reducing the pressure in the interior of the refilling cartridge to a value less than the pressure in the interior of the container. The air in the interior of the container can then pass through the air passage towards the interior of the refilling cartridge, thus lowering the pressure in the interior of the container to a desired value. The steps of increasing the pressure in the interior of the refilling cartridge and of reducing the pressure are then repeated a plurality of times until reaching the desired filled level.

In a preferred embodiment of the invention, the lower portion of the piston comprises an outer side surface, which is cylindrical according to the axial direction, facing the inner side surface, extending between an upper edge and a lower edge, wherein the side port is facing the outer side surface, an upper perimetral sealing lip arranged in the upper portion of the outer side surface, and a lower perimetral sealing lip arranged in the lower portion of the outer side surface.

In this preferred solution, during a movement of actuation of the pump, the piston moves according to the axial direction between an expanded position and a retracted position, going through an intermediate position, wherein when the piston is in any position between the expanded position and the intermediate position, the side port is arranged between the upper perimetral sealing lip and the lower perimetral sealing lip, and when the piston is in any position between the intermediate position and the retracted position, the side port is arranged, in the axial direction, above the upper perimetral sealing lip. Between the piston, the pump body, and the fixing means there is an air passage suitable for establishing a fluidic communication between the exterior and the side port when the piston is in any position between the intermediate position and the retracted position. In this preferred embodiment, step [2] takes place specifically by moving the piston to any position between the intermediate position and the retracted position, thereby establishing a fluidic communication between the interior of the refilling cartridge and the inner volume.

It should be taken into account that the indicated steps do not necessarily have to all be performed in the indicated sequence, but rather other sequences are also possible. For example, steps [1] and [2] and/or at least part of the sub-steps they comprise (positioning the container such that the bottom is in the lower position, fluidically connecting the interior of a refilling cartridge comprising a refilling liquid with the air passage, moving the piston from the expanded position in order to open the air passage) can be satisfactorily performed in several different sequences and/or some of them can be performed simultaneously. Therefore, the indicated order is not a rigid definition of the sequence in which the steps and sub-steps take place, but rather is a mere indication of the steps comprised in the method according to the invention.

Preferably in step [3], the pressure is increased between 0.5 and 2 bar above atmospheric pressure. This pressure is high enough so as to allow a refilling with a smaller number of steps but without subjecting the container to such a high excess pressure that may cause said container to break.

Advantageously, steps [3] and [4] are performed between 2 and 4 times, and preferably between 3 and 4 times.

Preferably, the method further comprises an evaluation step [2a] in which the pressure to which the refilling liquid in the interior of the refilling cartridge is subjected to is increased to an evaluation pressure, the evaluation step being performed before steps [3] and [4] and not being part of step [5]. This evaluation step [2a] is performed to assure that the container will bear the pressure.

Preferably, the increase and decrease of pressure to which the refilling liquid in the interior of the refilling cartridge is subjected to is performed by means of a compressing piston, said piston being able to travel within a sleeve. This is a robust and easy to maintain system.

Preferably, the evaluation step [2a] is performed to determine the air volume of the refilling cartridge according to the following formula:

$$V_{cart} = \frac{V_p(P - P_{ev}) + P_{ev}x_{ev}S}{P_{ev} - P}$$

wherein, $V_c$ is the air volume, in $m^3$, of the refilling cartridge, $V_p$ is the air volume, in $m^3$, within the sleeve that the piston will compress, P is the initial pressure, in Pa, which is the pressure prior starting to increase the pressure to which the refilling liquid in the interior of the refilling cartridge is subjected to, $P_{ev}$ is the evaluation pressure in Pa $x_{ev}$ is the travel of the piston during said evaluation step in m, and S is the area of the section of the piston in $m^2$.

This allows to determine the air volume of the refilling cartridge and, therefore, determine the travel x of the piston for the following piston cycles. This travel x is such that it allows not to over pressurize the container and to apply a pressure to the container near the maximum target pressure.

Even more preferably, the method further comprises a step of calculating the number of times steps [3] and [4] will be performed using the following formula:

$$n = \frac{\ln(\text{Ratio})}{\ln(P/P')}$$

wherein, n is the number of times steps [3] and [4] will be performed,

P is the initial pressure, which is the pressure prior starting to increase the pressure to which the refilling liquid in the interior of the refilling cartridge is subjected to, P' is the final pressure, which is the pressure prior reducing the pressure to which the refilling liquid in the interior of the refilling cartridge is subjected to, and Ratio is the ratio between the final air volume of a container to be refilled with respect to the total air volume that the container to be refilled contains when the container is empty.

This allows to determine the number of cycles the piston must perform to refill a container, regardless of the type of container or liquid remaining in the refilling cartridge. Even more preferably, the method further comprises a step of calculating the air volume of the container according to the following formula:

$$V_{cont} = \frac{P'}{P' - P} xS - V_p - V_{cart}$$

wherein, $V_{cont}$ is the initial air volume, in $m^3$, of the container 26, P is the initial pressure, in Pa, P' is the final pressure, in Pa, $V_p$ is the initial air volume, in $m^3$, within the sleeve 63 that the piston 58 will compress, $V_{cart}$ is the initial air volume, in $m^3$, of the refilling cartridge, x is the travel of the piston 58 in m, S is the area of the section of said piston 58 in $m^2$, This allows to determine the air volume of the container, so it is possible to determine if the liquid within the refilling cartridge will be enough to refill the container.

Preferably, in the method according to the invention the refilling cartridge comprises an individualized identifier for each refilling cartridge and the method comprises a verification step by a user to verify the individualized identifier of the full refilling cartridge, this verification step being performed prior to fluidically connecting the interior of the refilling cartridge comprising a refilling liquid with the air passage. An advantageous alternative is presented when the method is performed by means of a machine comprising a reader of the individualized identifier and communication means suitable for establishing communication with a verifying entity of the individualized identifier (and, advantageously, also with other external databases), and the verification step is performed automatically by the machine, in which case the following is particularly advantageous: [a] if said verification gives a positive result, the machine continues with the refilling method and disables the individualized identifier (notifying the verifying entity that it has been used), and/or [b] if the verification gives a negative result, the machine interrupts the refilling method. Another advantageous alternative is presented when the verification step is performed by the user with other means, preferably by means of a mobile telephone.

Preferably, in the method according to the invention the inlet valve is a ball valve.

Another object of the invention is a refilling cartridge of the type indicated above, characterized in that it comprises an inlet with an inlet valve arranged in said upper portion and an outlet arranged on said base.

Preferably, the inlet valve is a three-position valve, and very preferably comprises: [a] a conduit, defining a longitudinal axis, with a first segment with a first cross-section, a second segment with a second cross-section different from the first cross-section, and a third segment with a third cross-section different from the second cross-section, and [b] a stopper, housed in the conduit, with a cross-section such that when the stopper is in the first segment or in the third segment the valve is open and when the stopper is in the second segment the valve is closed. Advantageously, the first cross-section and the third cross-section are polygonal and the stopper has a circular cross-section, the circular cross-section being of a diameter greater than the diameter of a circle inscribed in any of the polygonal cross-sections, and it is particularly advantageous for the first cross-section and the third cross-section to be triangular. In turn, it is advantageous for the second cross-section to be circular and for the stopper to also have a circular cross-section, the circular cross-section of the stopper being of a diameter greater than the diameter of the second cross-section. An inlet valve of this type is inexpensive to manufacture and can be made entirely of one and the same material. It is very simple for the valve to pass from the open position to the closed position and, subsequently, to the open position again.

Preferably, the stopper of the inlet valve is spherical.

Advantageously, the outlet comprises a perforable film. In an alternative advantageous solution, the outlet comprises an outlet valve comprising: [a] a conduit, defining a longitudinal axis, with a first segment with a first cross-section and a second segment with a second cross-section different from the first cross-section, wherein the first segment is oriented towards the interior of the refilling cartridge and the second segment is oriented towards the exterior of the refilling cartridge, and [b] a stopper, housed in the conduit, with a cross-section such that when the stopper is in the first segment the valve is open and when the stopper is in the second segment the valve is closed. In this alternative, it is advantageous for the first cross-section to be polygonal and for the stopper to have a circular cross-section, the circular cross-section being of a diameter greater than the diameter of a circle inscribed in the polygonal cross-section, and it is particularly advantageous for the first cross-section to be triangular. In this alternative, it is also advantageous for the second cross-section to be circular and for the stopper to also have a circular cross-section, the circular cross-section of the stopper being of a diameter greater than the diameter of the second cross-section.

Preferably, the stopper of the outlet valve is spherical.

In an advantageous embodiment of a refilling cartridge according to the invention, the upper portion has a weakening area demarcating a central area, wherein the weakening area has a shape such that the central area has a perimeter equal to the inner surface of the side wall, such that the central area is suitable for being used as a piston running along the side wall. Refilling cartridges of this type can thereby be used with machines having a pushing member which pushes the central area, tearing the upper portion in the weakening area, and then pushing the liquid out through the outlet. As will be seen below, another preferred embodiment consists of injecting air (or any gas in general) into the interior of the refilling cartridge.

In another preferred embodiment of the invention, the inlet valve and/or the outlet valve is a self closing valve. Even more preferably, the self closing valve comprises a spring and a closing member, where the spring pushes the closing member against a valve seat. Therefore, the refilling cartridge containing these valves can be reused.

Preferably, the refilling cartridge comprises axial stiffening means. Preferably, these axial stiffening means comprise a hollow column, with a side opening, wherein the column extends from the base to the upper portion, and the hollow column is advantageously attached to the upper portion.

Preferably, the refilling cartridge comprises radial stiffening means. Advantageously, these radial stiffening means comprise a plurality of ribs extending between the side wall and the base and/or comprise a plurality of ribs extending radially along the upper portion.

Indeed, these refilling cartridges are subjected to high pressures, so they must also be kept with a high pressure. All this makes it convenient to reinforce the refilling cartridge both in an axial direction, to prevent deformations when being secured by the machine, and in a radial direction, to prevent deformations due to high internal pressure during the process of refilling the container.

Preferably, the base and the side wall are a single part and the upper portion is an independent part assembled on the side wall. The manufacturing process is thereby optimized, reducing costs.

Advantageously, the refilling cartridge is made entirely of one and the same polymer material. The assembly can thereby be recycled without the need to perform separation processes.

Preferably, the refilling cartridge comprises an individualized identifier for each refilling cartridge. The individualized identifier is advantageously a barcode, preferably a matrix barcode and very preferably a QR code.

The invention can be used with a management system for managing a refilling cartridge comprising an individualized identifier according to the invention, where the management system comprises the following steps:

[a] assigning a specific individualized identifier to a specific refilling cartridge during the manufacture of the refilling cartridge and marking the refilling cartridge with the individualized identifier,

[b] validating the individualized identifier during the filling process of the refilling cartridge,

[c] verifying the individualized identifier of the full refilling cartridge by a user, and, preferably, marking the individualized identifier after being used in a refilling method, and disabling the individualized identifier for future uses.

Preferably, the system includes an additional step in which, after the disabling step for disabling the identifier, the appropriate person is informed of the disabling step performed, preferably including information about the type of refilling cartridge, the date on which and location where disabling has taken place.

Finally, another object of the invention is a machine for performing a method according to the invention, characterized in that it comprises:

a housing for housing the container with the bottom oriented downwards, connection means for connecting a refilling cartridge according to the invention to the bottle, establishing a fluidic communication between the interior of the refilling cartridge and the air passage, pressurizing means for increasing the pressure in the interior of the refilling cartridge above atmospheric pressure, depressurizing means for reducing the pressure in the interior of the refilling cartridge, control means for performing at least two pressurizing and depressurizing cycles one after the other and automatically.

Preferably, the machine comprises adjustment means for adjusting the distance between the container and the connection means. Given that there is a plurality of container and dispensing pump designs on the market which have different heights, the presence of the adjustment means allows the machine to be used for a plurality of different designs.

Advantageously, the connection means are removable. In general, it is of interest the machine to be compatible with a plurality of containers that are different from one another, which will have dispensing pumps different from one another. Indeed, although the dispensing pumps must always have the same elements required for the invention, they may vary in regard to other elements that are not indispensable for the invention. However, these differences may require the connection means to be different in the support area with the pump (diameters, heights) depending on the pump in question. It may also be appropriate for the connection means to be compatible with different families of refilling cartridges. Being able to provide a family of connection means and being able to use one or the other, depending on the container (with the corresponding pump) to be refilled, is therefore of interest.

Preferably, the connection means comprise, in the upper portion thereof, opening means of an outlet arranged at the base of the refilling cartridge. In a preferred embodiment, the opening means comprise a needle, and very preferably a collapsible guard of the needle. In another preferred embodiment, the opening means comprise a rod suitable for pushing a stopper housed in a conduit arranged in the outlet of the refilling cartridge.

Advantageously, the connection means comprise, in the lower portion thereof, a support surface suitable for moving the piston and a closure surface suitable for being supported on the pump and forming a sealed closure between the air passage and the exterior, such that the air passage only in fluidic communication with the interior of the refilling cartridge.

Preferably, the connection means further comprise an annular ring for supporting said base of said refilling cartridge. The annular ring prevents the cartridge from collapsing when axial force is applied to the refilling cartridge.

Preferably, the machine comprises a reader for reading the individualized identifier and communication means suitable for establishing communication with a verifying entity of the individualized identifier.

Preferably, the control means comprises means for executing the evaluation step [2a]. Therefore, the machine can determine the maximum pressure that the container can be subjected to.

Preferably, the pressurizing means comprises a compressing piston and a sleeve, the piston being able to travel within the sleeve. In this case, it is particularly advantageous if the control means comprises means for determining the air volume of said refilling cartridge according to the following formula:

$$V_{cart} = \frac{V_p(P - P_{ev}) + P_{ev}x_{ev}S}{P_{ev} - P}$$

wherein, $V_{cart}$ is the air volume, in $m^3$, of the refilling cartridge, $V_p$ is the air volume, in $m^3$, within the sleeve (63) that the piston will compress, P is the initial pressure, in Pa, which is the pressure prior starting to increase the pressure to which the refilling liquid in the interior of the refilling cartridge is subjected to, $P_{ev}$ is the evaluation pressure in Pa $x_{ev}$ is the travel of the piston during said evaluation step in m, and S is the area of the section of the piston in $m^2$.

This allows the machine to determine the air volume of the refilling cartridge and, therefore, determine also the number of cycles that the piston must perform to refill a container.

Even more preferably, the control means comprises means for calculating the number of times steps [3] and [4] will be performed using the following formula:

$$n = \frac{\ln(\text{Ratio})}{\ln(P/P')}$$

wherein, n is the number of times steps [3] and [4] will be performed,

P is the initial pressure, which is the pressure prior starting to increase the pressure to which the refilling liquid in the interior of the refilling cartridge is subjected to, P is the final pressure, which is the pressure prior reducing the pressure to which the refilling liquid in the interior of the refilling cartridge is subjected to, and Ratio is the ratio between the final air volume of a container to be refilled with respect to the total air volume that the container to be refilled contains when the container is empty.

This allows the machine to determine the number of cycles the piston must perform to refill a container, regardless of the type of container or liquid remaining in the refilling cartridge.

Even more preferably, the control means comprises means for calculating the air volume of the container according to the following formula:

$$V_{cont} = \frac{P'}{P' - P}xS - V_p - V_{cart}$$

wherein, $V_{cont}$ is the initial air volume, in $m^3$, of the container 26, P is the initial pressure, in Pa, P' is the final pressure, in Pa, $V_p$ is the initial air volume, in $m^3$, within the sleeve 63 that the piston 58 will compress, $V_{cart}$ is the initial air volume, in $m^3$, of the refilling cartridge, x is the travel of the piston 58 in m, S is the area of the section of said piston 58 in $m^2$, This allows to determine the air volume of the container, so it is possible to determine if the liquid within the refilling cartridge will be enough to refill the container.

BRIEF DESCRIPTION OF THE DRAWINGS

Further advantages and features of the invention will become apparent from the following description, in which, without any limiting character, preferred embodiments of the invention are disclosed, with reference to the accompanying figures. In the figures.

DETAILED DESCRIPTION OF EMBODIMENTS OF THE INVENTION

Figure 1:
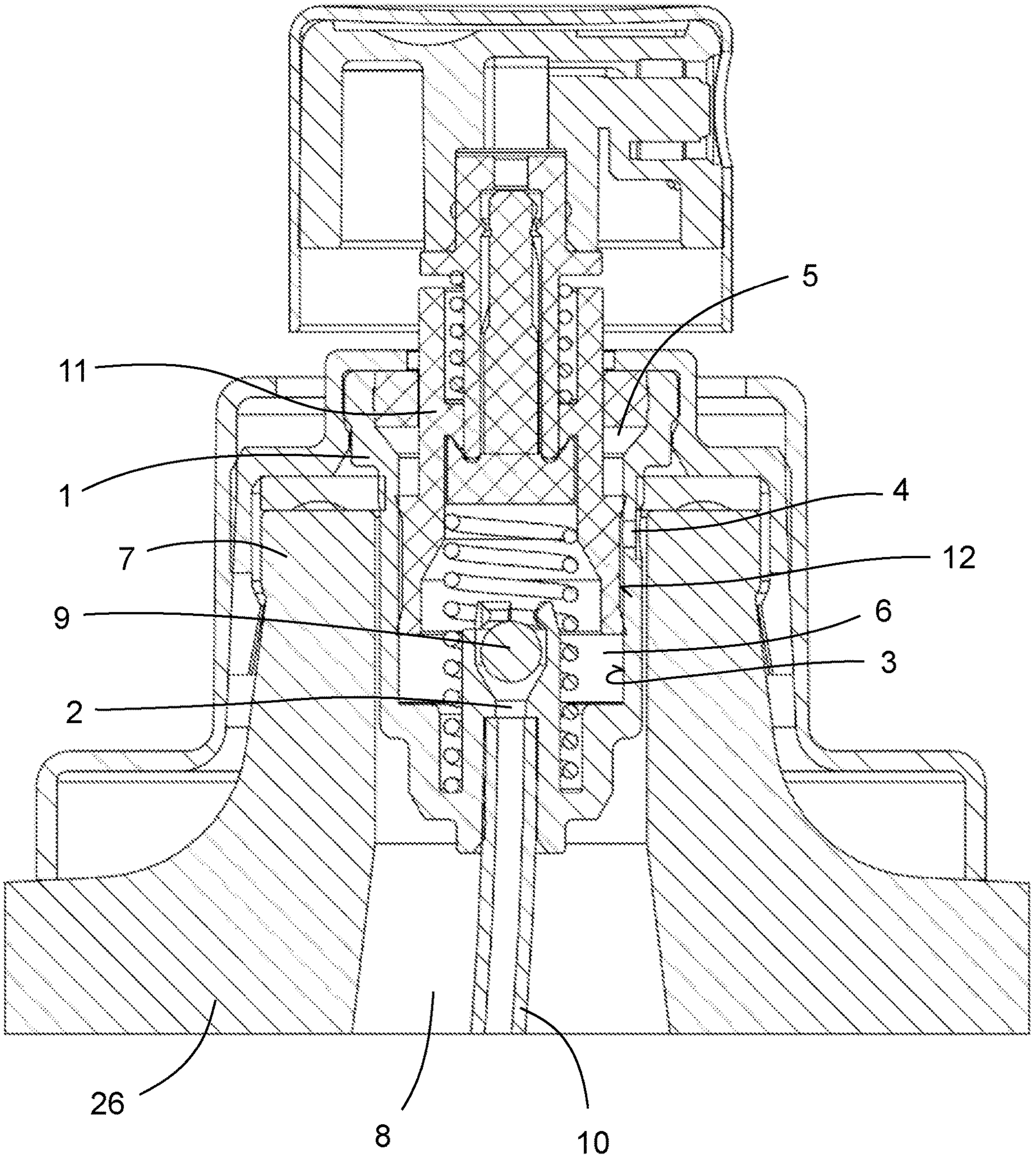
FIGS. 1 to 4 show a longitudinal section of a dispensing pump in four positions of the pumping cycle.
Figure 2:
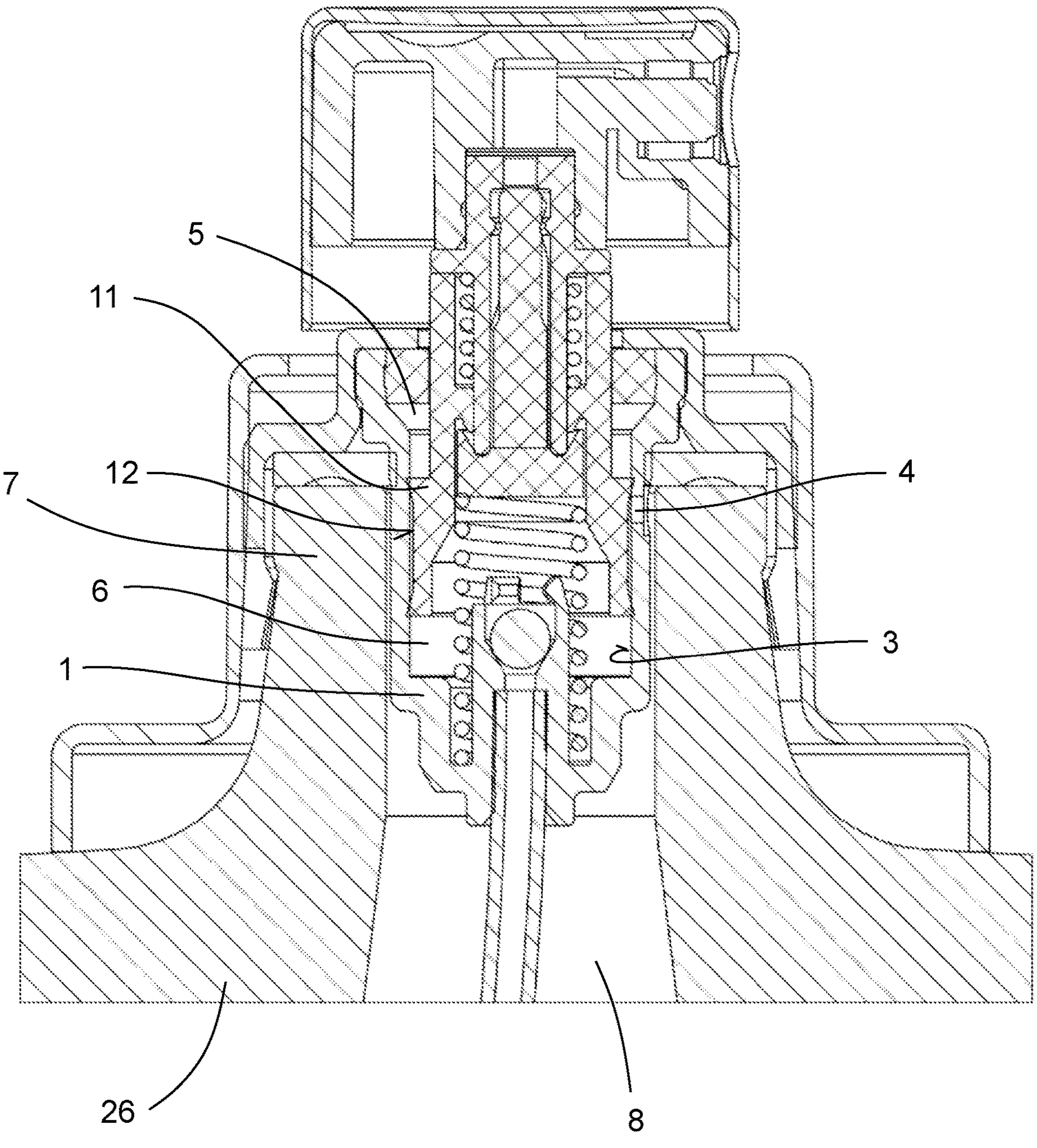
Figure 3:
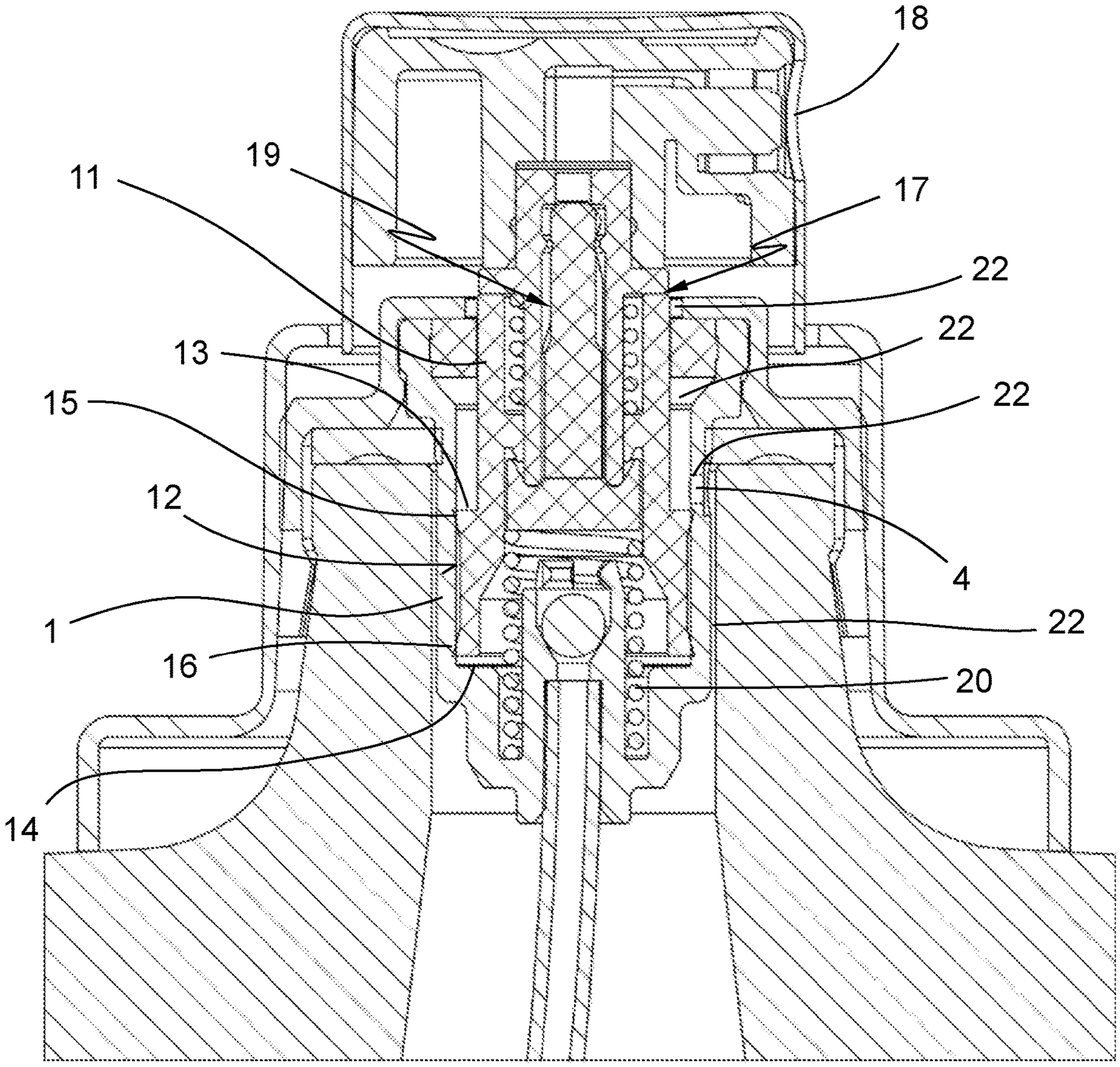
Figure 4:
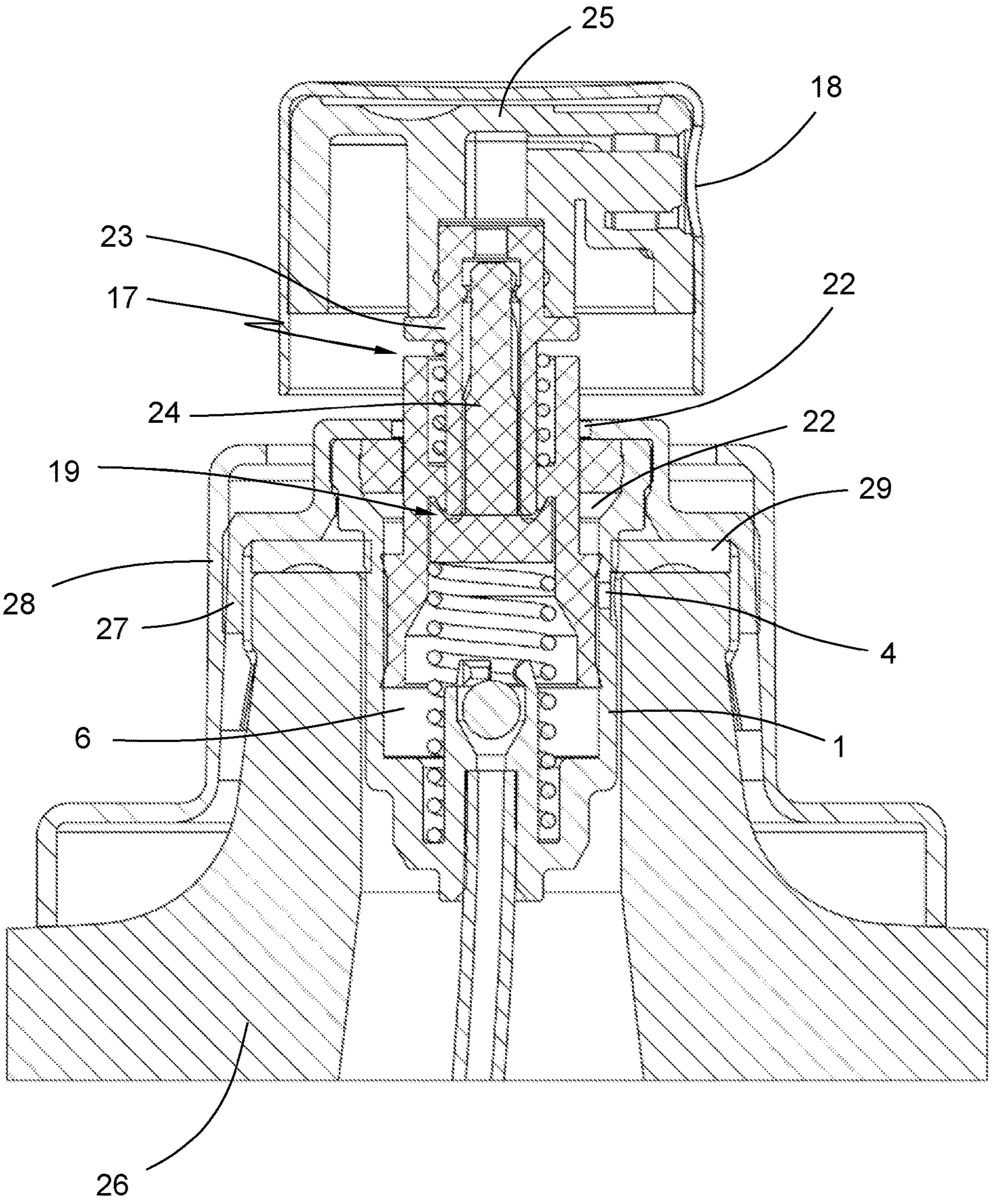
Figure 5:
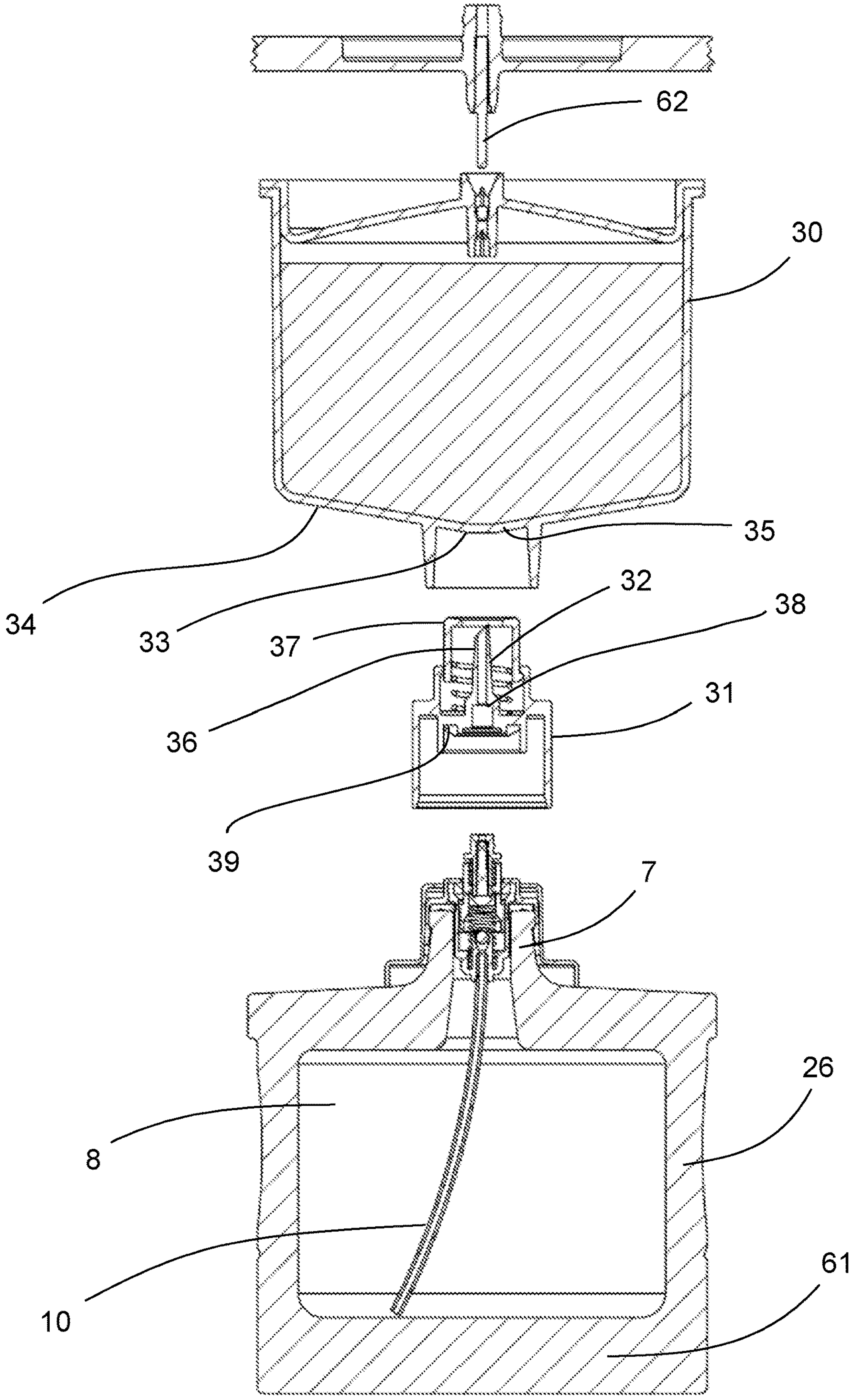
FIGS. 5 to 8 show a sequence of the steps of the method according to the invention.
Figure 6:
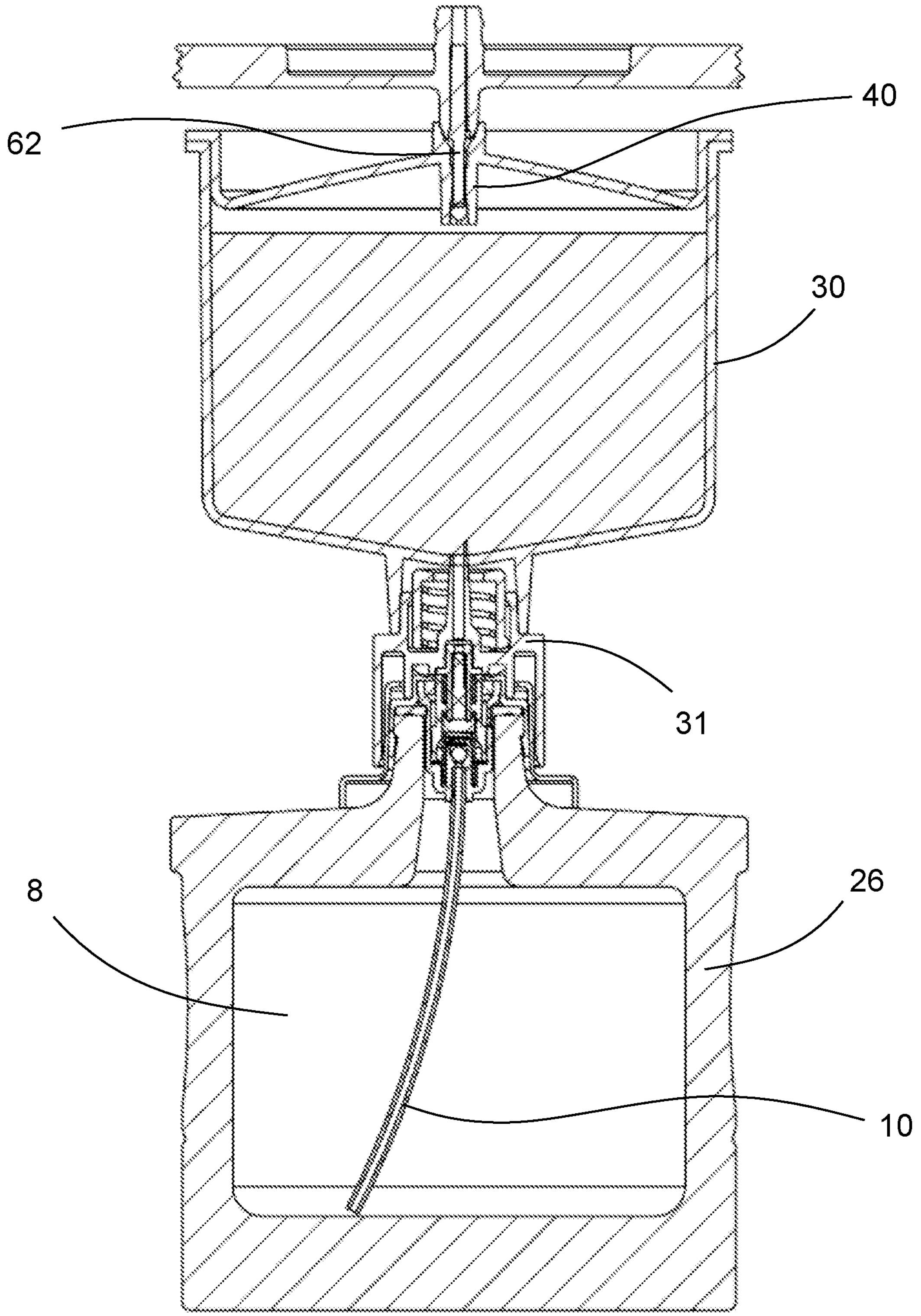

In general, the method according to the invention is performed for refilling containers having a specific type of dispensing pumps, as indicated above. FIGS. 1 to 4 show the operation of these pumps. Even though there exist a plurality of similar pump designs, with differences between one another, they all share elements which are essential for the invention, as indicated above. The remaining details are not relevant for the invention and can therefore be different from those shown in FIGS. 1 to 4. The dispensing pump comprises:

[a] a pump body 1 with:

[a.1] a lower inlet port 2,

[a.2] a cylindrical inner side surface 3 defining an axial direction,

[a.3] a side port 4 arranged on the inner side surface 3, and

[a.4] an upper opening 5, wherein the pump body 1 defines a pumping chamber 6 in the interior thereof, wherein when the pump is in an assembled position, the upper opening protrudes from the neck 7 of the container 26 on which the pump is assembled and the lower inlet port 2 is inside the container 26, and the side port 4 communicates the inner side surface 3 with the inner volume 8 of the container 26,

[b] an inlet valve 9 (which is preferably a ball valve, regardless of the remaining elements described in this pump) arranged between the inlet port 2 and the pumping chamber 6, suitable for allowing the entry of liquid in the interior of the pumping chamber 6 through the inlet port 2 and for blocking the exit of liquid in the interior of the pumping chamber 6 through the inlet port 2,

[c] a suction tube 10 having one end connected to the inlet port 2 and extending towards the bottom 61 of the container 26,

[d] a piston 11 with:

[d.1] a lower portion housed inside the pump body 1 and comprising:

[d.1.1] an outer side surface 12, which is cylindrical according to the axial direction, facing the inner side surface 3, extending between an upper edge 13 and a lower edge 14, wherein the side port 4 is facing the outer side surface 12,

[d.1.2] an upper perimetral sealing lip 15 arranged in the upper portion of the outer side surface 12,

[d.1.3] a lower perimetral sealing lip 16 arranged in the lower portion of the outer side surface 12, and

[d.2] an upper portion with evacuation means 17 (an assembly of elements of the pump corresponding with everything that is related to the exit of the liquid from the pumping chamber 6 to the exterior is referred to as "evacuation means") comprising an outlet port 18 and an outlet valve 19, arranged between the outlet port 18 and the pumping chamber 6, suitable for allowing the exit of liquid from the interior of the pumping chamber 6 through the outlet port 18 and for blocking the entry of air in the interior of the pumping chamber 6 through the outlet port 18,

[e] elastic means 20 suitable for generating a force in the axial direction and prone to separating the piston from the pump body 1, and

[f] fixing means for fixing the pump in the neck 7.

During a movement of actuation of the pump, the piston 11 moves according to the axial direction between an expanded position (shown in FIG. 1) and a retracted position (shown in FIG. 3), going through a intermediate position (shown approximately in FIG. 2), wherein when the piston 11 is in any position between the expanded position and the intermediate position, the side port 4 is arranged between the upper perimetral sealing lip 15 and the lower perimetral sealing lip 16, and when the piston 11 is in any position between the intermediate position and the retracted position, the side port 4 is arranged, in the axial direction, above the upper perimetral sealing lip 15. Between the piston 11, the pump body 1, and the fixing means there is an air passage 22 suitable for establishing a fluidic communication between the exterior and the side port 4 when the piston 11 is in any position between the intermediate position and the retracted position.

The evacuation means 17 are arranged in the upper portion of the piston 11, and comprise a cannula 23 (usually referred to as "stem"), a movable plug 24 and a head 25. The stem 23 is hollow and the lower portion thereof is located inside the piston 11 and the upper portion protrudes out of the piston 11. The head 25 is assembled on the upper portion of the stem 23. The hollow interior of the stem 23 establishes a fluidic passage between the pumping chamber 6 and the head 25, which in turn has a passage that allows the exit of the pumped liquid to the exterior, through the outlet port 18. The movable plug 24 is housed inside the stem 23. The lower end of the movable plug 24 protrudes below the stem 23 and is housed inside the piston 11. The lower end of the movable plug 24 has a perimetral edge suitable for being housed in a perimetral groove present in the piston 11, both elements thus forming the outlet valve 19.

The pump is fixed to the container 26 by means of a fixing part 27 and a sleeve 28. These two elements form the fixing means and fix the pump body 1 to the neck 7 of the bottle in a leak-tight manner (thanks to a gasket 29) but allow the movement of the piston 11. More specifically, there is a passage between the piston 11 and the fixing part 27 which allows air to pass between the exterior and an intermediate chamber arranged between the upper portion of the pump body 1 and the piston 11, above the upper perimetral sealing lip 15. Therefore, when the dispensing pump is in its retracted position (see FIG. 3), an air passage 22 communicating the interior of the container 26 with the exterior is established. These dispensing pumps have this air passage 22 envisaged for allowing the entry of air in the container 26 and thus compensating for the vacuum formed by the liquid that is pumped, preventing a lower pressure being generated in the interior of the container 26. However, as discussed in detail below, in the present invention this air passage 22 is used to introduce the liquid from the refilling cartridge 30 in the interior of the container 26, refilling it. It will also serve to allow the exit of air in the interior of the container 26 which, while refilling, is at an overpressure. Therefore, the air passage 22 transitions to having a triple function: allowing the entry of air during normal use of the pump, allowing the entry of liquid during the refilling method, and allowing the outlet of air during the refilling method. As previously indicated, the dispensing pump described in the present figures is merely an example of among the existing plurality of pumps and there may be differences in detail between them. What is important for the present invention is that the mentioned air passage 22 (envisaged for allowing the entry of air to compensate for the exit of the pumped liquid) exists, since it is this air passage 22 that will be used by the invention for refilling the container 26.

A sequence of the steps of the method according to the invention can be observed in FIGS. 5 to 8.

First, the container 26 is positioned in its normal position, i.e., with the bottom 61 in the lower position, such that the liquid in its inner volume 8 accumulates at the bottom 61 and the free end of the suction tube 10 is located below the free surface of the liquid, or at least, even in the event that it is above said free surface, it is so close that it will be immediately below said surface after having refilled a negligible amount of liquid. The head 25, which will be again placed at the end of the refilling process, will be extracted.

The interior of a refilling cartridge 30 comprising the refilling liquid is fluidically connected with the air passage 22. To that end, connection means 31 are used. The connection means 31 have opening means 32 in the upper portion thereof for opening an outlet 33 arranged at the base 34 of the refilling cartridge 30. In the example of FIGS. 5 to 8, the outlet 33 is a perforable film 35 and the opening means 32 comprise a needle 36 and a collapsible guard 37 of the needle 36. The connection means 31 have, in the lower portion thereof, a support surface 38, suitable for being supported on the stem 23 and pushing the piston 11 downwards, and a closure surface 39 suitable for being supported on the fixing part 27, forming a sealed closure, such that the air passage 22 is no longer in communication with the exterior but rather only with the interior of the refilling cartridge 30.

The piston 11 is moved to any position between the intermediate position (see FIG. 2) and the retracted position (see FIG. 3), i.e., to any position in which the side port 4 is arranged, in the axial direction, above the upper perimetral sealing lip 15 and, therefore, the air passage 22 is in fluidic communication with the inner volume 8 of the container 26. As previously discussed, there are several steps of the method according to the invention which can be performed in sequences different from those written. Thus, for example, this step of moving the piston 11 is preferably done in parallel with the fluidic connection step for fluidically connecting the interior of the refilling cartridge 30 with the air passage 22.

Figure 7:
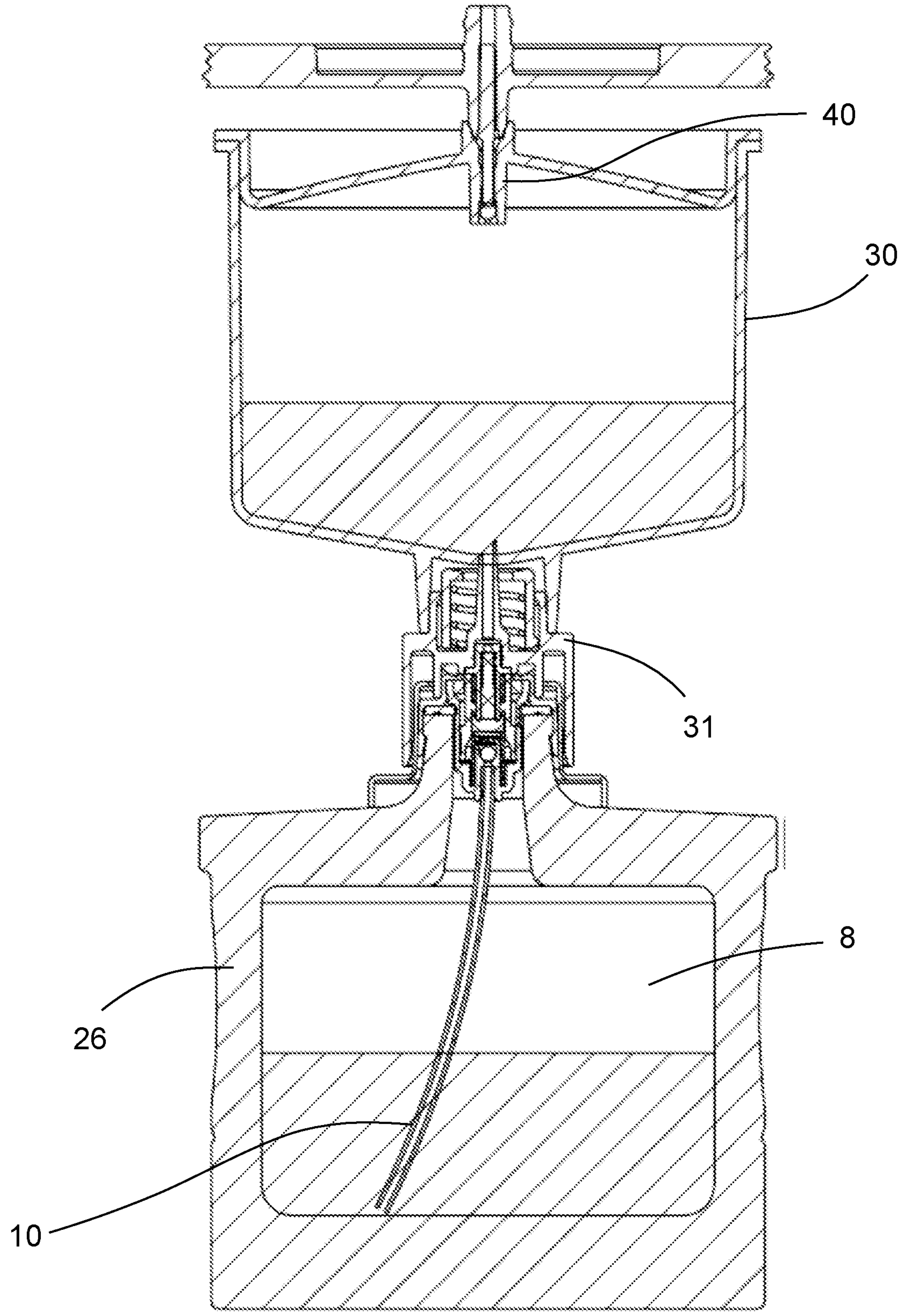
Figure 8:
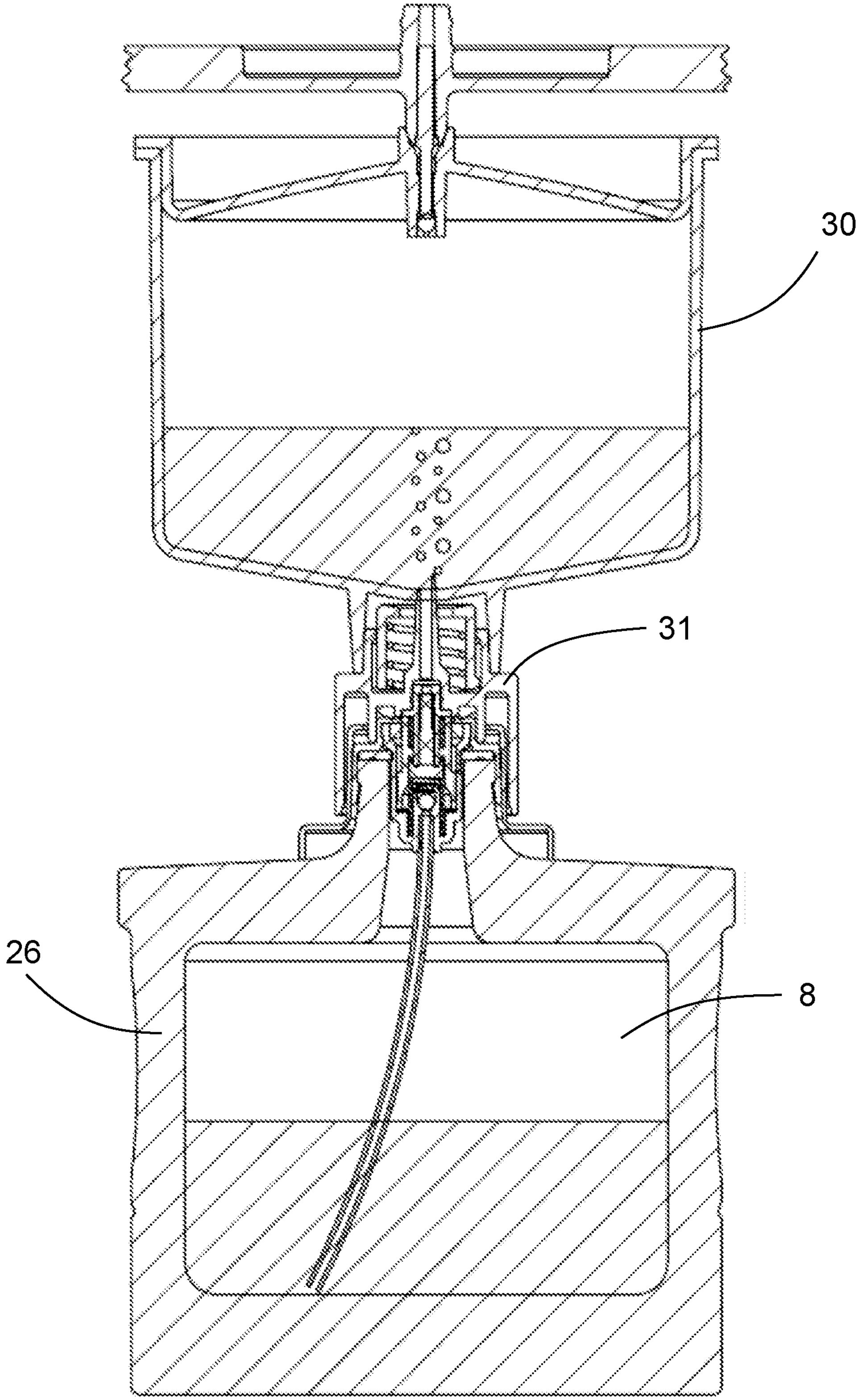
Figure 9:
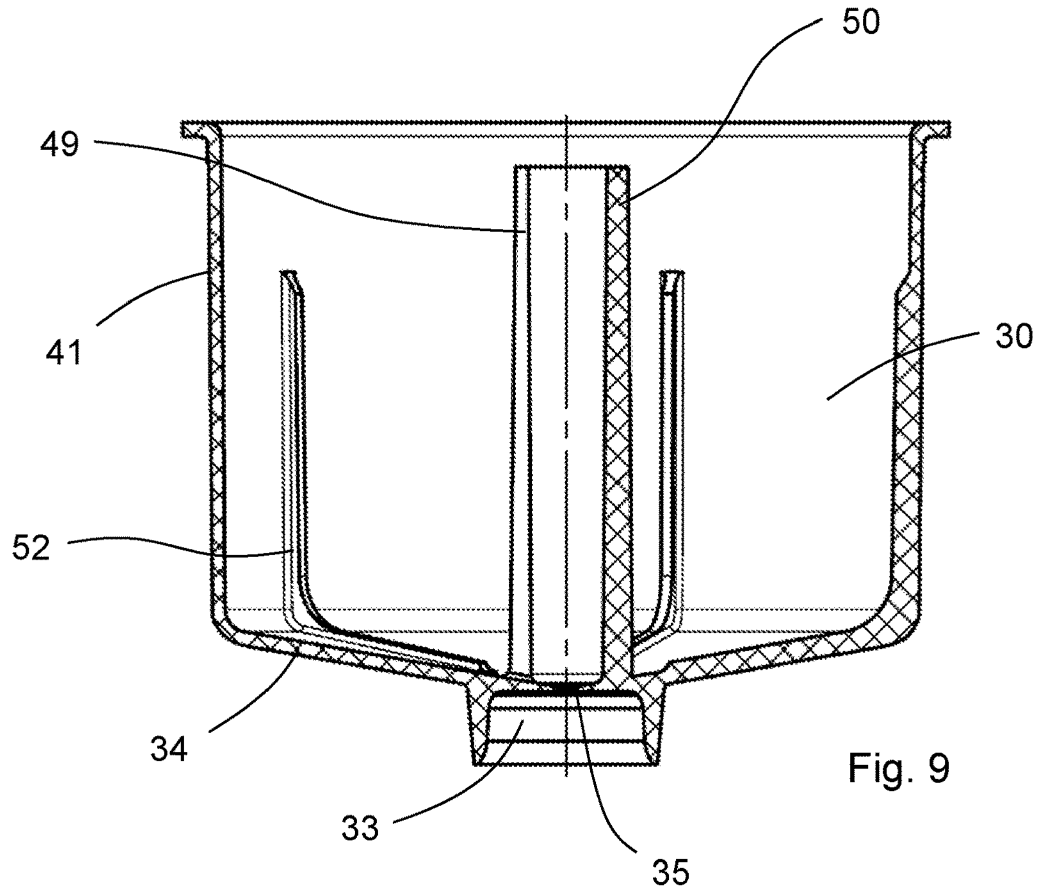
FIGS. 9 to 11 show a longitudinal section, a perspective view, and a top plan view of a main body of a first embodiment of a refilling cartridge according to the invention.
Figure 10:
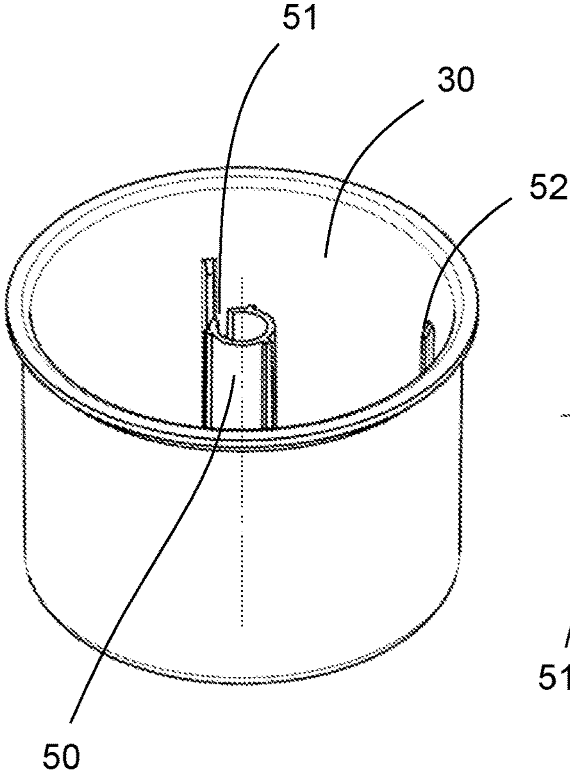
Figure 11:
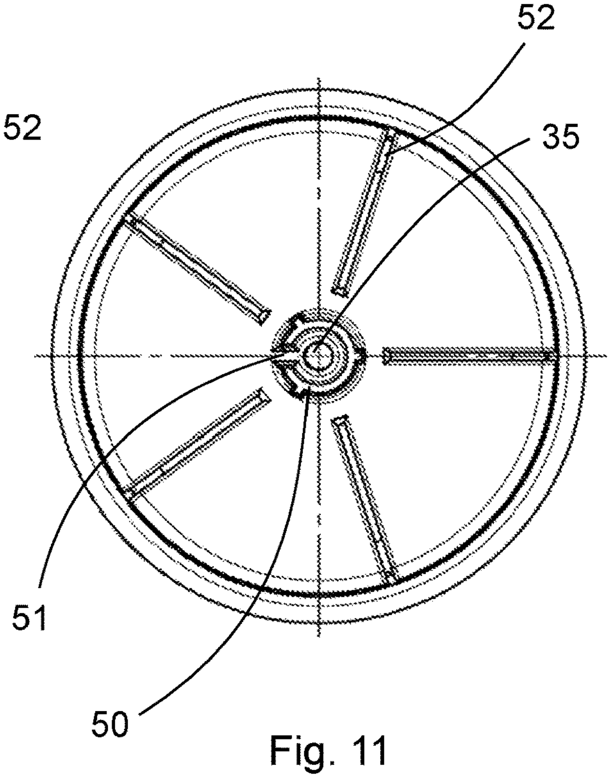
Figure 12:
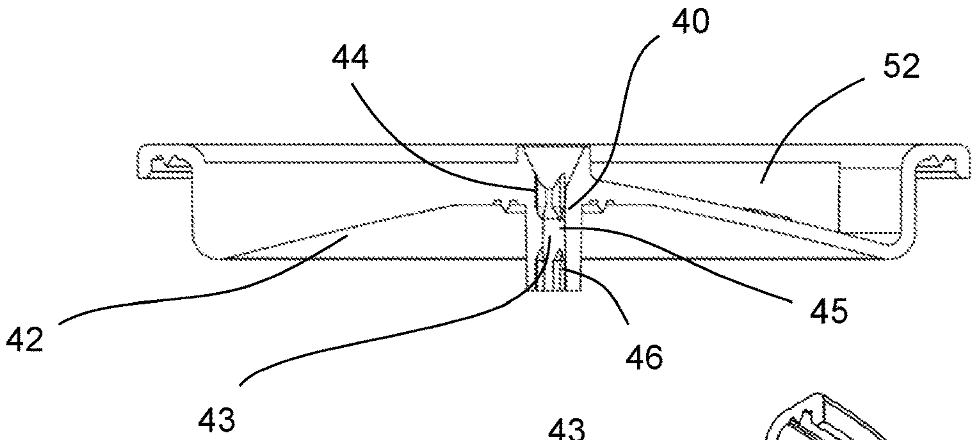
FIGS. 12 to 14 show a longitudinal section, a sectioned perspective view, and a detail of a top plan view of a lid of a refilling cartridge according to the invention.
Figure 13:
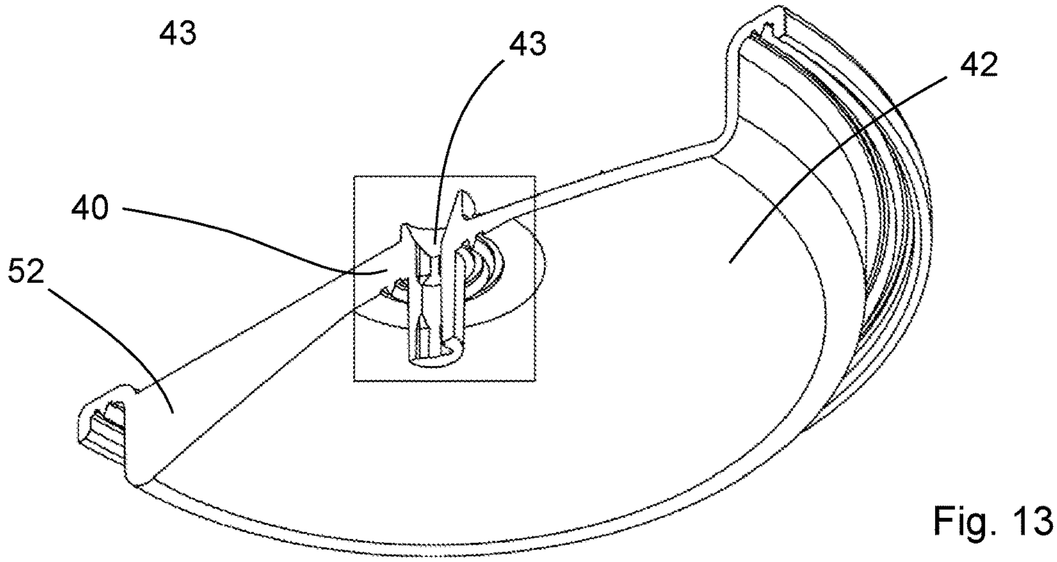
Figure 14:
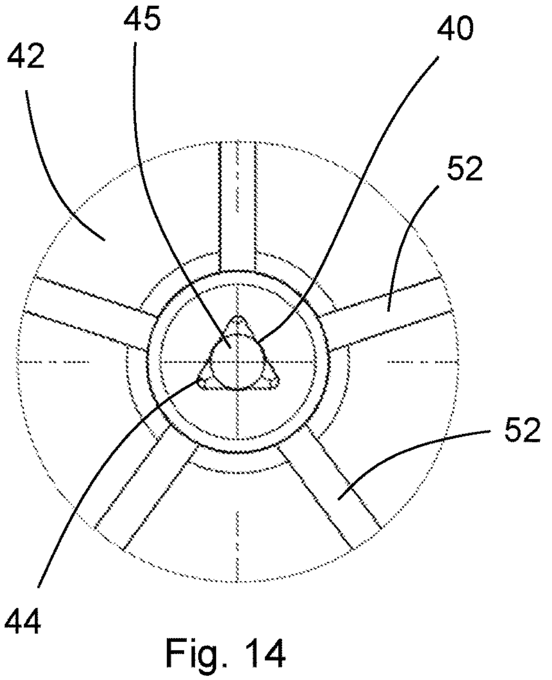
Figure 15:
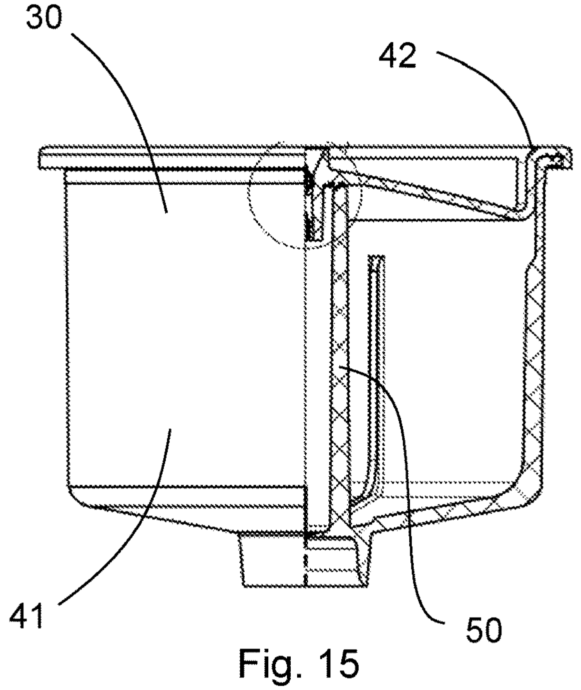
FIG. 15 shows a partially sectioned elevation view of the assembly formed by the main body of FIGS. 9 to 11 and the lid of FIGS. 12 to 14.
Figure 16:
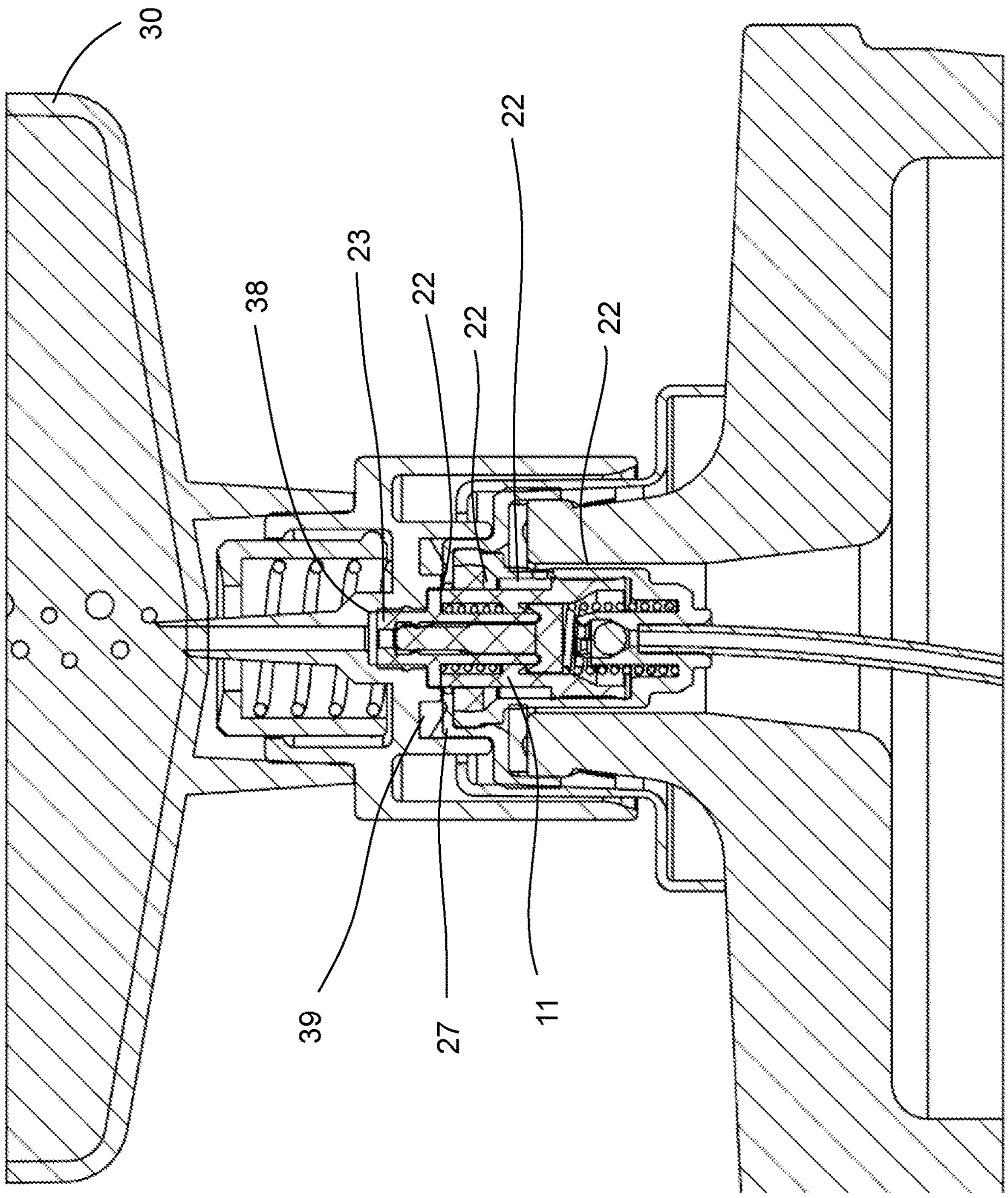
FIG. 16 shows an enlarged view of the connection means of FIG. 8.
Figure 31:
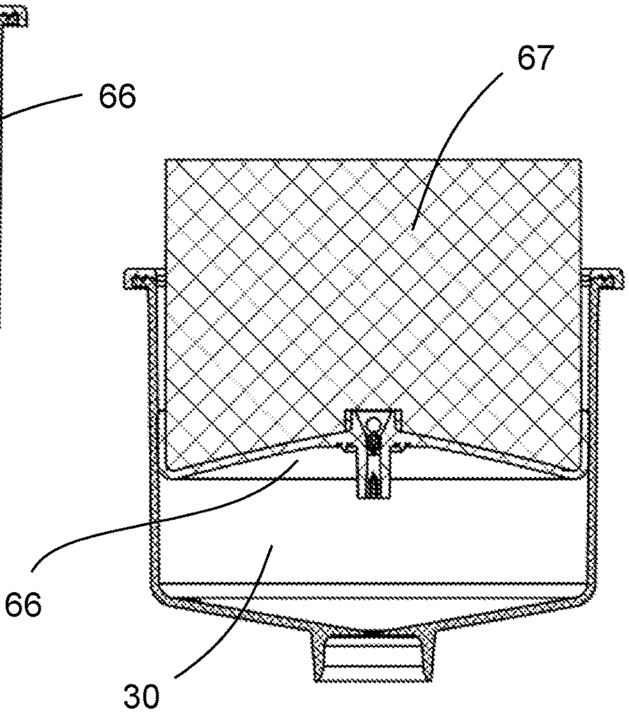
FIG. 31 shows a view equivalent to the view of FIG. 30, but including an external pushing member moving the central area.

Once the fluidic connections have been established (see FIGS. 6 and 16) the pressure is increased up to the pressure to which the liquid in the interior of the refilling cartridge 30 is subjected, thereby causing the passage of part of the liquid to the inner volume 8, thereby increasing the pressure in the inner volume 8 (the air in the interior of the inner volume 8 cannot exit anywhere, since the suction tube 10 has its free end below the free surface of the liquid). For increasing the pressure to which the liquid in the interior of the refilling cartridge 30 is subjected, air (or any other gas) can be injected into the interior of the refilling cartridge 30, for example, through the inlet valve 40 of the refilling cartridge 30, as shown in FIG. 7. However, other solutions are also possible, such as conceiving the upper portion of the refilling cartridge 30 as a plunger which can be moved (see FIGS. 28 to 31). In the refilling cartridge shown in FIGS. 28 to 31, the upper portion 42 has a weakening area 65 demarcating a central area 66. This central area 66 has a perimeter equal to the inner surface of the side wall 41, such that it is suitable for being used as a piston running along the side wall 41. FIG. 31 shows an external pushing member 67 (for example, that it is part of a machine according to the invention) which is pushing the central area 66, which increases the pressure in the liquid in the interior of the refilling cartridge, such that it exits through the outlet 33.

If the container 26 is refilled with a single injection of liquid, the volume of air that was initially in the container 26 is compressed to a very small volume, which greatly increases the pressure in the interior of the container 26. To prevent these high increases in pressure for which the container has not been designed, the method according to the invention contemplates a step in which the pressure to which the refilling liquid in the interior of the refilling cartridge 30 is subjected is reduced to a value less than the pressure in the inner volume 8, thereby allowing part of the air under pressure in the inner volume 8 to pass into the interior of the refilling cartridge 30 through the air passage 22 (see FIG. 8). Then the cycle of injecting liquid and decompressing the container 26 is repeated a plurality of times until achieving the desired filled level, after which the refilling cartridge 30 can be disconnected.

FIGS. 9 to 15 show a refilling cartridge 30 according to the invention. The refilling cartridge 30 has a main body (FIGS. 9 to 11), with a side wall 41 and a base 34, and a lid (FIGS. 12 to 14), which is assembled on the main body (see FIG. 15), thus forming the upper portion 42 of the refilling cartridge 30. Preferably, the lid is welded to the side wall. In another advantageous embodiment of a refilling cartridge according to the invention, the lid is formed as a single part with the side wall 41 and it is the base 34 that is configured as an independent part, attached (preferably by welding) to the side wall 41.

Figure 17:
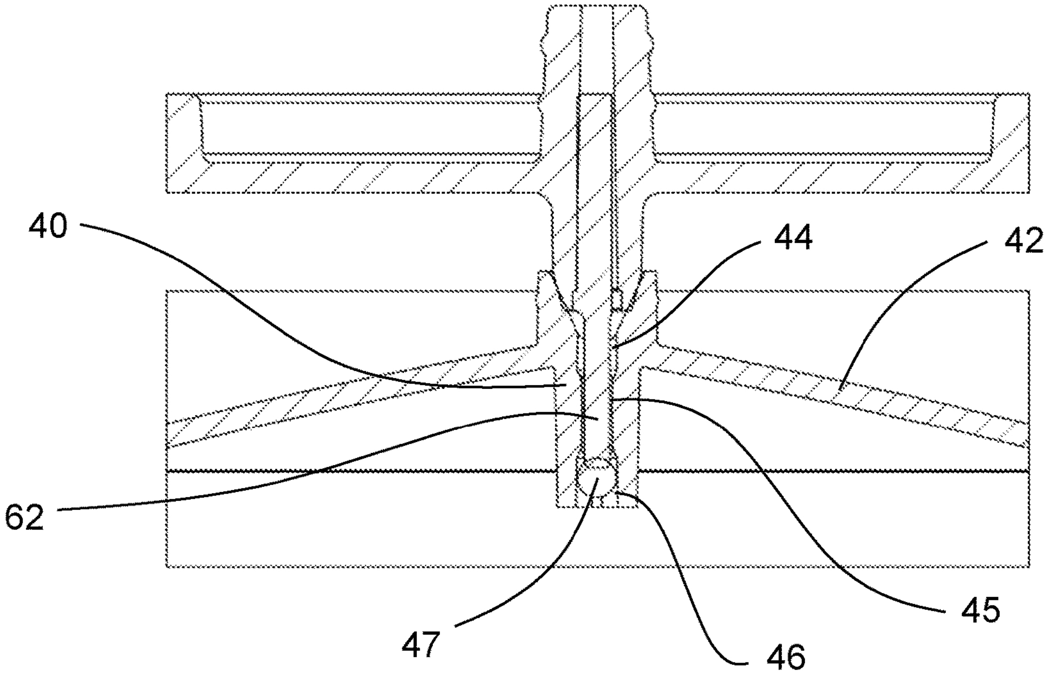
FIG. 17 shows a longitudinal section of an inlet valve of a refilling cartridge according to the invention, with a rod pushing the stopper.
Figure 18:
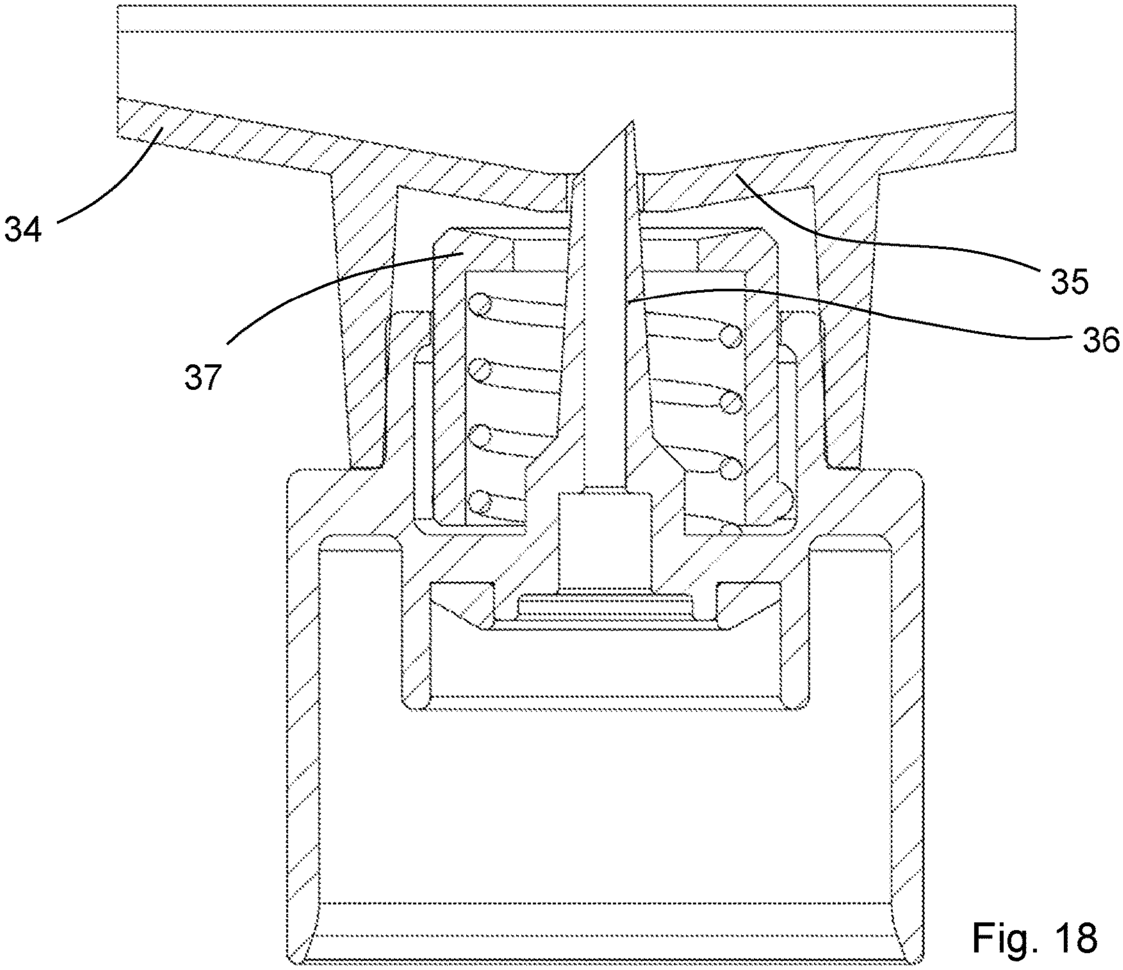
FIG. 18 shows a longitudinal section of the connection means connected to a refilling cartridge.
Figure 19:
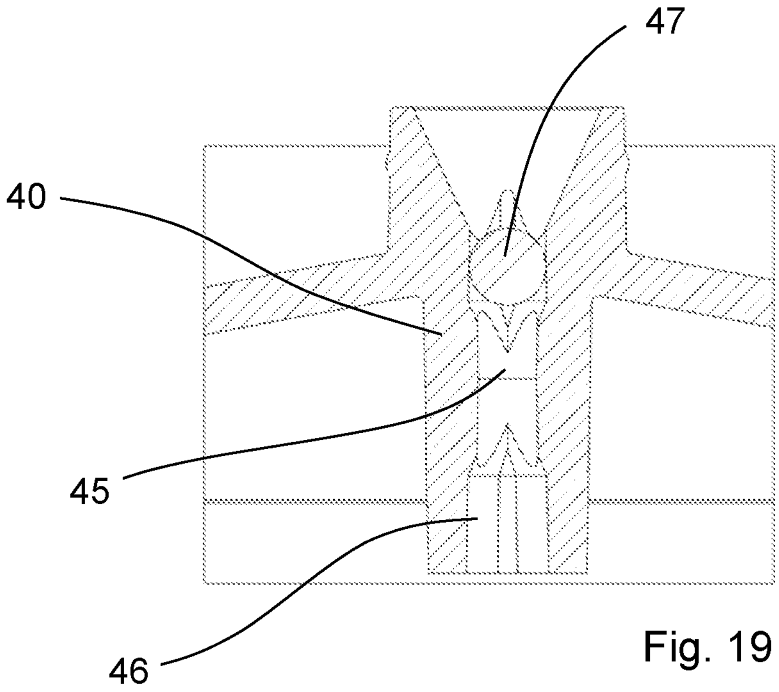
FIGS. 19 and 20 show a longitudinal section of an inlet valve of a refilling cartridge with the stopper in two positions.
Figure 20:
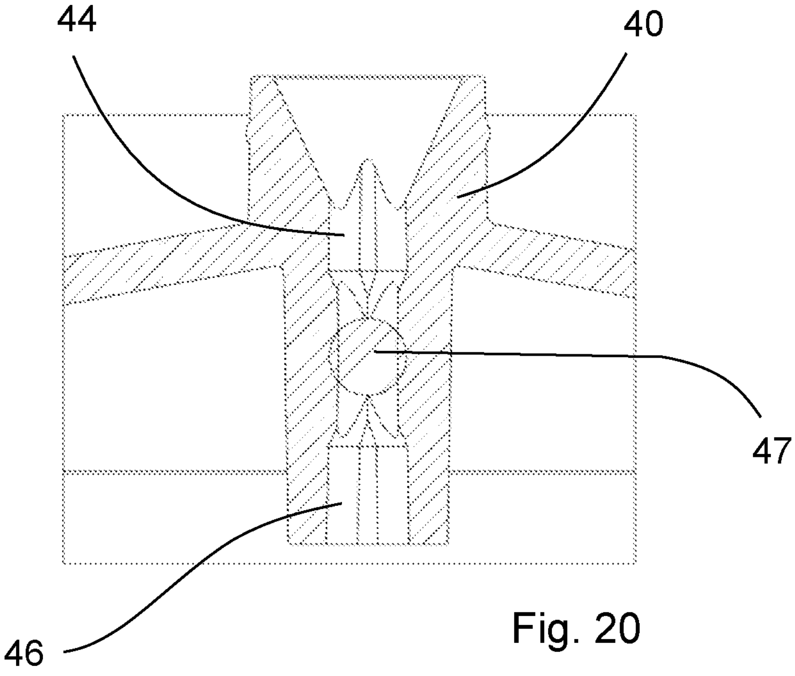

In the lid of the refilling cartridge 30 there is an inlet with an inlet valve 40. The inlet valve 40 of the refilling cartridge 30 (see FIGS. 12 to 14, 17, 19, and 20) comprises: [a] a conduit 43, defining a longitudinal axis, with a first segment 44 with a first triangular cross-section, a second segment 45 with a second cross-section circular, and a third segment 46 with a third cross-section which is also triangular and equal to the first cross-section, and [b] a spherical stopper 47 housed in the conduit 43. The diameter of the stopper 47 is greater than the diameter of the circle inscribed in the triangular cross-sections, such that the stopper is retained both in the first section and in the third section, except if a force greater than a predetermined value is applied thereto. However, the diameter of the stopper 47 is small enough so as to leave free passages at the vertexes of the triangles (see FIG. 14). Therefore, when the stopper 47 is in the first segment 44 or in the third segment 46, the valve is open. The stopper 47 also has a diameter greater than the diameter of the circular cross-section, so the inlet valve 40 is closed when the stopper 47 is in the second segment 45. Thus, the refilling cartridge 30 is manufactured with the stopper 47 in the first segment 44 (inlet valve 40 open, see FIG. 19). The refilling cartridge 30 can thereby be filled with liquid, after which the stopper 47 is pushed so as to move it towards the second segment 45, where the refilling cartridge 30 is closed (see FIG. 20). When a container 26 is to be refilled with the liquid of the refilling cartridge 30, the stopper 47 is again pushed until it reaches the third segment 46, at which time the inlet valve 40 is open again (see FIG. 17) and, for example, air (or any other gas) can be injected into the interior of the refilling cartridge 30 for the purpose of increasing the pressure therein and forcing the exit of liquid through the outlet 33. The stopper 47 can be pushed by means of a rod 62, as shown in FIG. 17.

Figure 21:
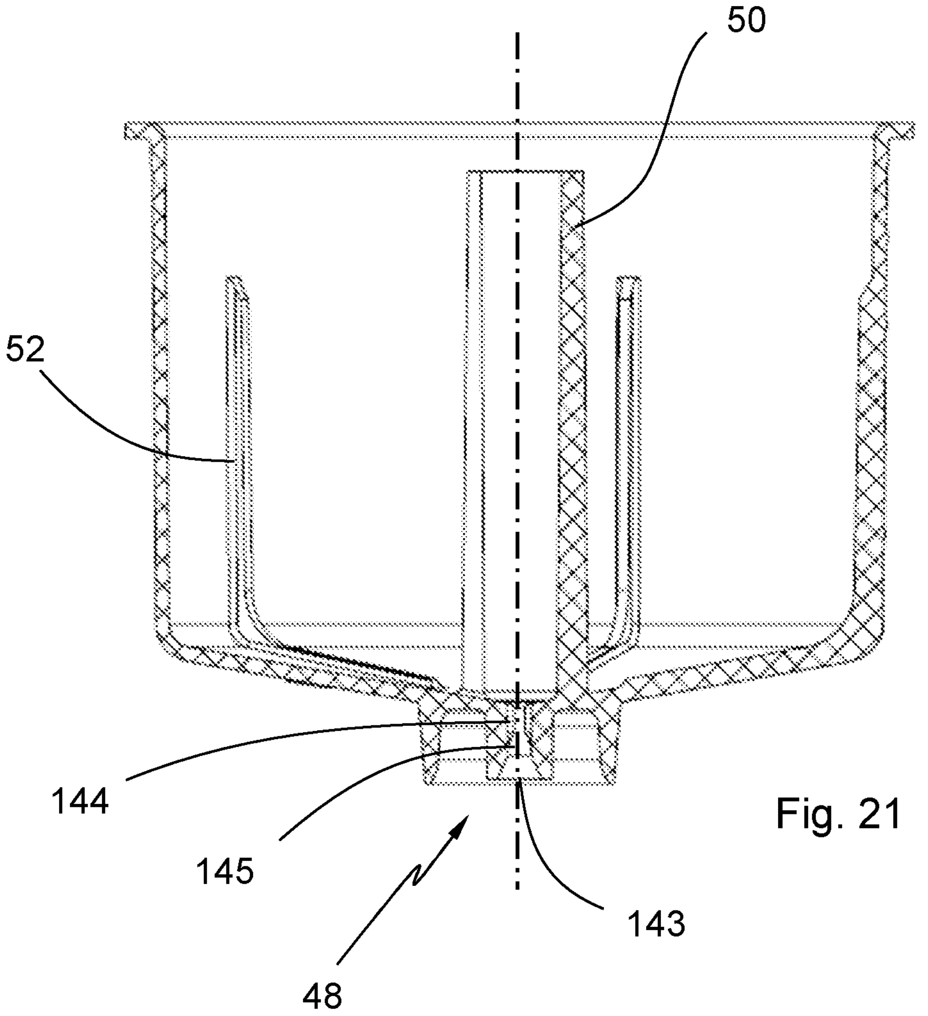
FIG. 21 shows a longitudinal section of a main body of a second embodiment of a refilling cartridge according to the invention.

At the base 34 of the refilling cartridge 30 is the outlet 33 which, in the embodiment of FIGS. 9 to 11, 15, 16, 18, and 28-31, is a perforable film 35. This perforable film 35 is what will be perforated by the needle 36 of the aforementioned connection means 31 (see FIGS. 6 to 8 and 18). The embodiment of FIG. 21 shows an outlet 33 which is not a perforable film but rather comprises an outlet valve 48 similar to the inlet valve 40, although with only two segments. Namely, the outlet valve 48 comprises: [a] a conduit 143, defining a longitudinal axis, with a first segment 144 (the one oriented towards the interior of the refilling cartridge 30) with a first triangular cross-section and a second segment 145 (the one oriented towards the exterior of the refilling cartridge 30) with a second circular cross-section, and [b] a spherical stopper, housed in the conduit 143. Similar to the case of the inlet valve 40, when the stopper is in the first segment 144 the outlet valve 48 is open and when the stopper is in the second segment 145 the outlet valve 48 is closed. In the event that the refilling cartridge 30 has an outlet valve 48 like the one described, the opening means will not have a needle but rather a rod 62 equivalent to the one shown in FIG. 17.

The refilling cartridge 30 comprises axial stiffening means 49 in the form of a hollow column 50 with a side opening 51. The column 50 extends from the base 34 to the upper portion 42, thus offering reinforcement with respect to stressing in the axial direction, particularly the stressing applied on the refilling cartridge 30 during the refilling method. Preferably, the hollow column 50 surrounds the edge of the outlet 33 of the refilling cartridge 30. The side opening 51, the origin of which is at the base 34, allows the liquid contained in the refilling cartridge 30 to flow in its entirety towards the outlet 33.

The refilling cartridge 30 also comprises radial stiffening means 52 in the form of ribs extending, on one hand, between said side wall 41 and said base 34 and, on the other, extending radially along said upper portion 42.

Figure 22:
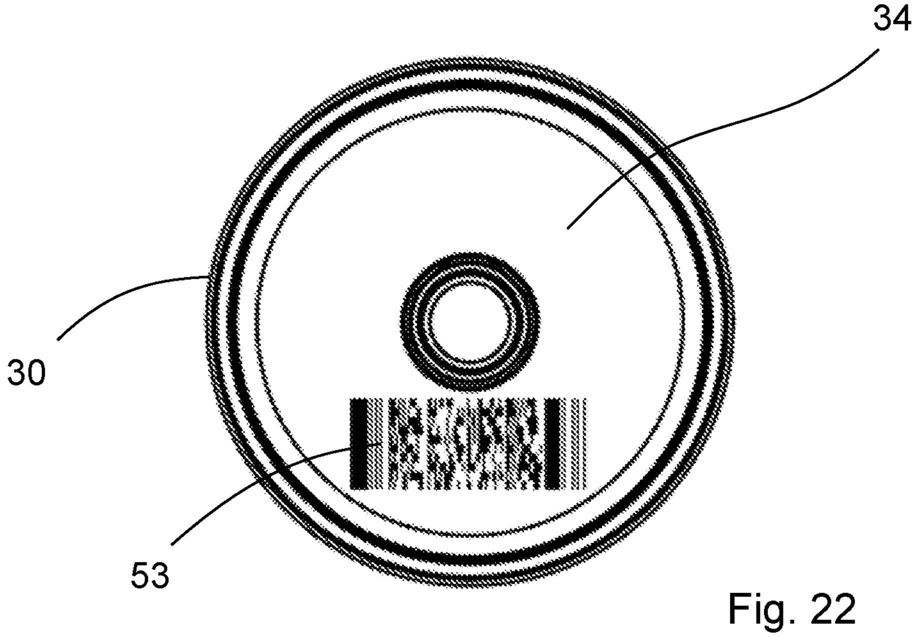
FIG. 22 shows a bottom plan view of a refilling cartridge with an individualized identifier.
Figure 26:
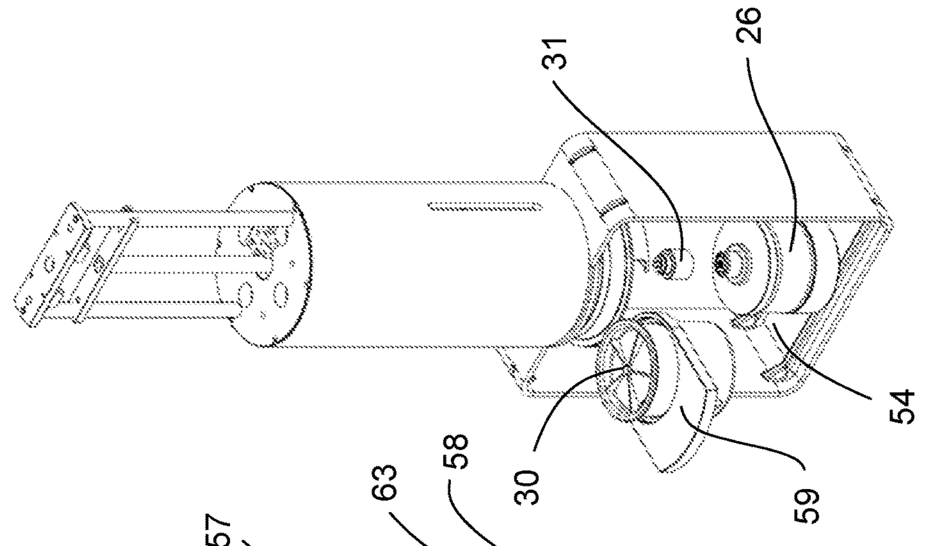
FIGS. 23 to 26 show a first embodiment of a machine according to the invention.
Figure 25:
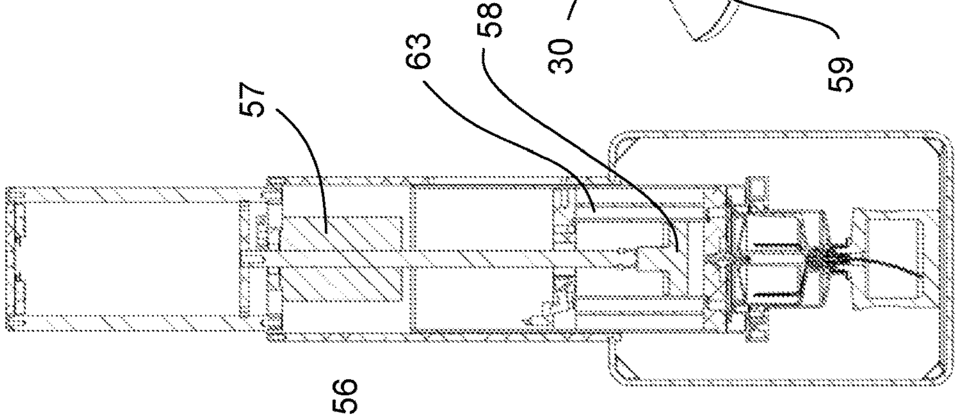
Figure 24:
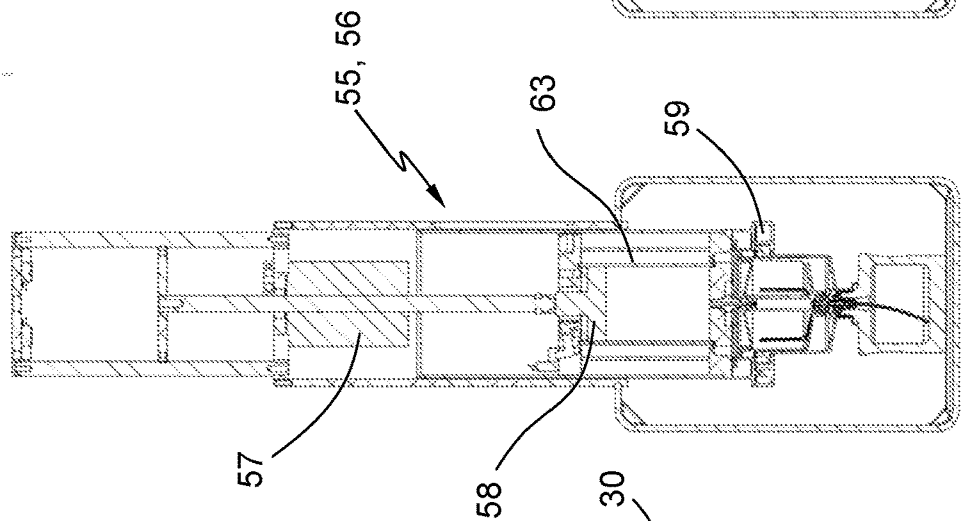
Figure 23:
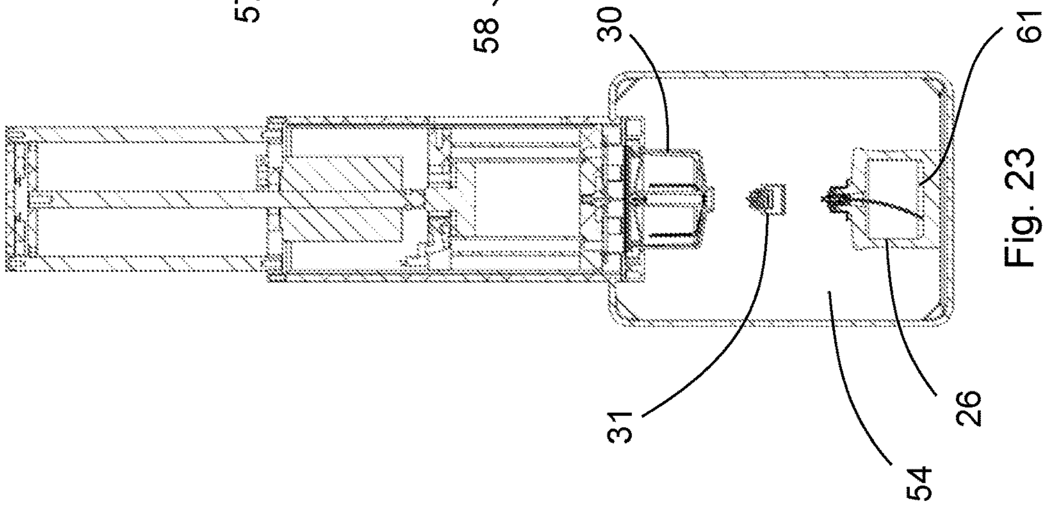

FIG. 22 shows a refilling cartridge 30 with an individualized identifier 53.

FIGS. 23 to 26 show an embodiment of a machine according to the invention. The machine comprises a housing 54 suitable for housing the container 26 with the bottom 61 oriented downwards, connection means 31 suitable for connecting a refilling cartridge 30 to the container 26, establishing a fluidic communication between the interior of the refilling cartridge 30 and the air passage 22, pressurizing an depressurizing means 55 suitable for changing the pressure in the interior of the refilling cartridge 30, and control means suitable for performing at least two pressurizing and depressurizing cycles, one after the other and automatically. The machine also comprises adjustment means 56 for adjusting the distance between the container 26 and the connection means 31. In fact, the pressurizing and depressurizing means 55 and the adjustment means 56 are a mechanism with several common elements: a servomotor 57 controls the movement of a piston 58 with its sleeve 63 along a vertical axis arranged on the housing 54. Under the sleeve 63 and attached to it there is a refilling cartridge holder 59 suitable for supporting a refilling cartridge 30. The connection means 31 are arranged between the refilling cartridge 30 and the container 26. The activation of the servomotor 57 causes the movement of the piston+sleeve+refilling cartridge holder assembly until the refilling cartridge 30 is under pressure on the connection means 31 which are, in turn, on the dispensing pump. The assembly is thereby adjusted to the height of the container 26.

After this point the piston 58, which was fixed to the sleeve 63 at the beginning of its stroke, is released and starts to run along the sleeve 63, compressing the air in the interior thereof, which air will be injected into the interior of the refilling cartridge 30. In a certain position, the piston 58 is stopped, and after a period of time that allows the pressures to stabilize, i.e., the chamber pressure, the refilling cartridge pressure and the container pressure are the same, the servomotor 57 moves it upwards. This causes the pressure to drop, allowing the exit of the air under pressure that is in the inner volume 8 of the container 26 towards the interior of the refilling cartridge 30, as previously discussed.

Figure 27:
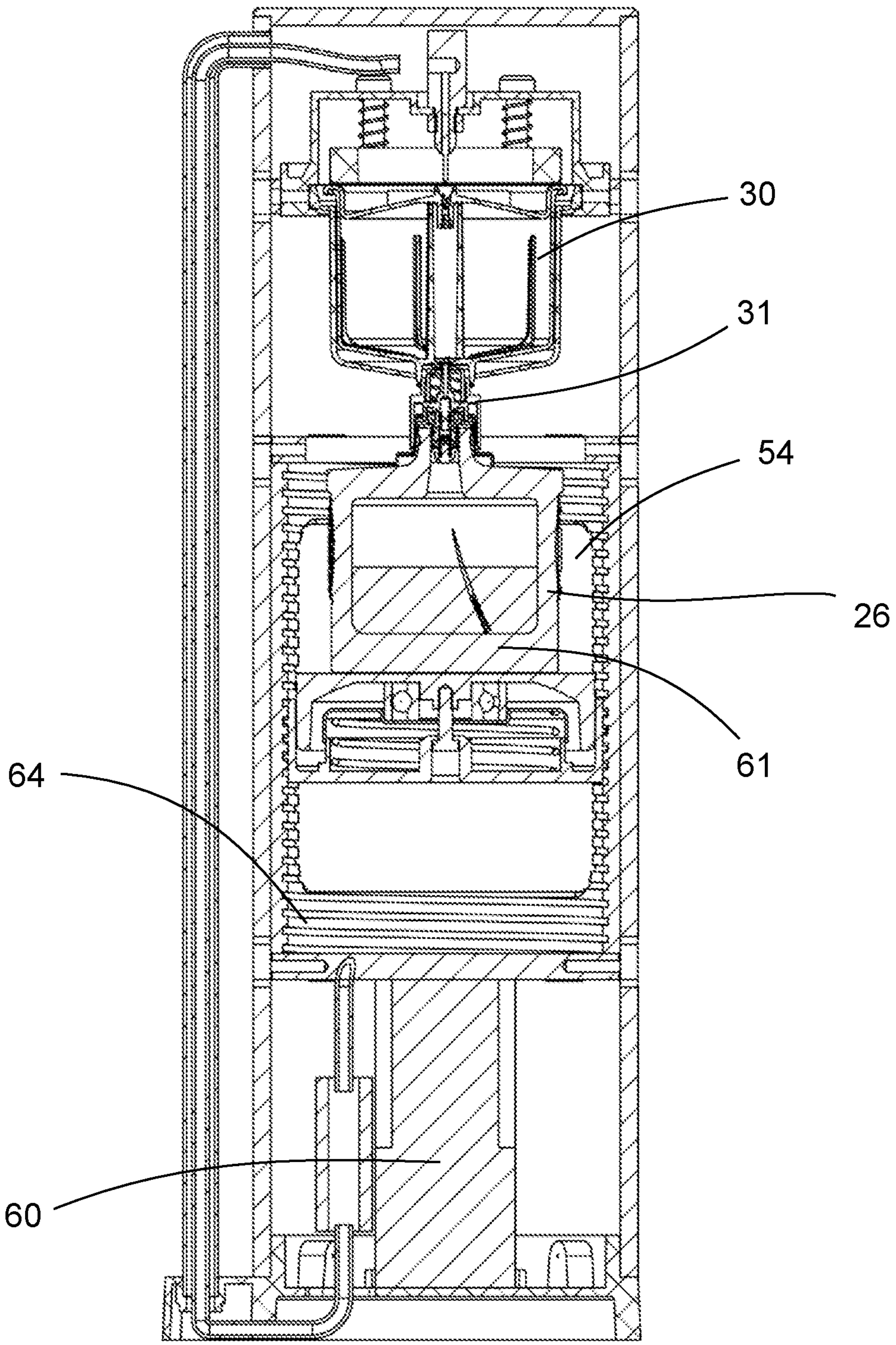
FIG. 27 shows a second embodiment of a machine according to the invention.
Figure 28:
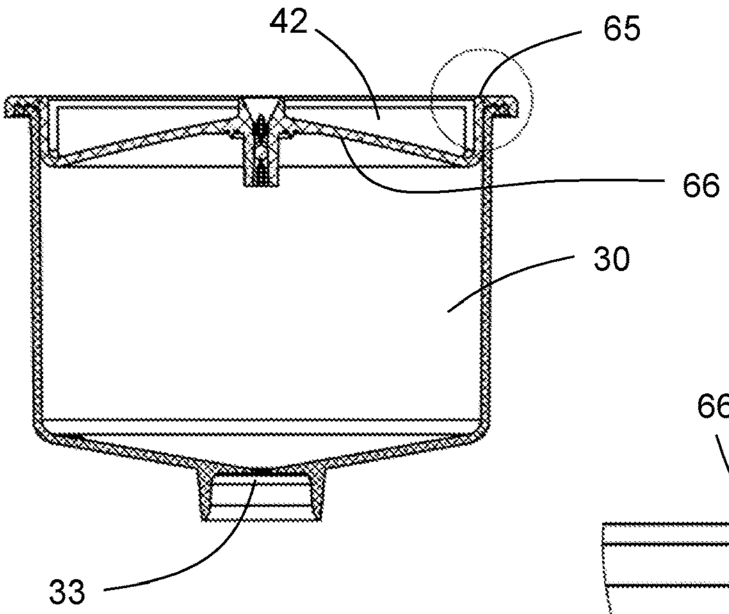
FIG. 28 shows a longitudinal section of another embodiment of a refilling cartridge according to the invention.
Figure 29:
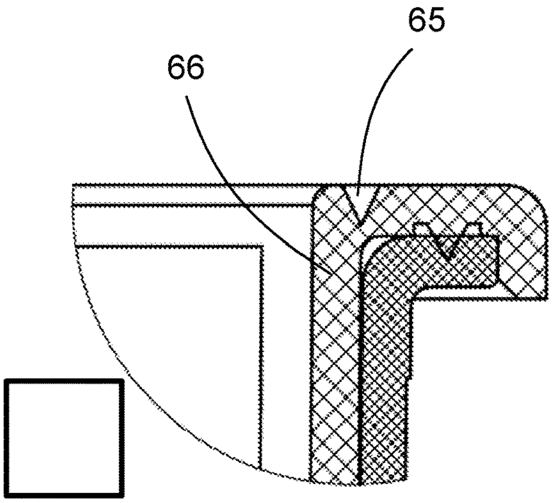
FIG. 29 shows an enlarged view of the area of attachment of the upper portion and the side wall of the refilling cartridge of FIG. 28.
Figure 30:
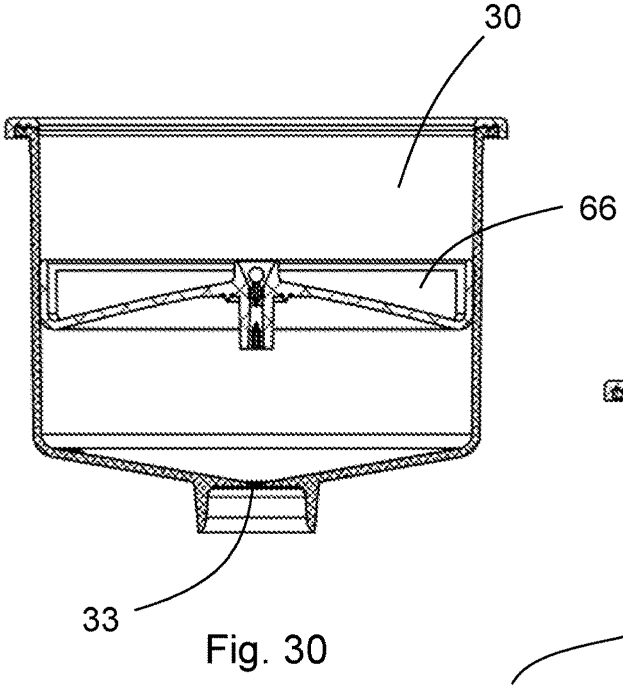
FIG. 30 shows a longitudinal section of the refilling cartridge of FIG. 28, with the central area of the upper portion in an intermediate position with respect to the side wall.

FIG. 27 shows another embodiment of a machine according to the invention. In this case, the machine comprises a compressor 60 which generates the air under pressure that will be injected into the refilling cartridge 30. In turn, a threading system 64 carries out the function of the adjustment means 56.

Figure 32:
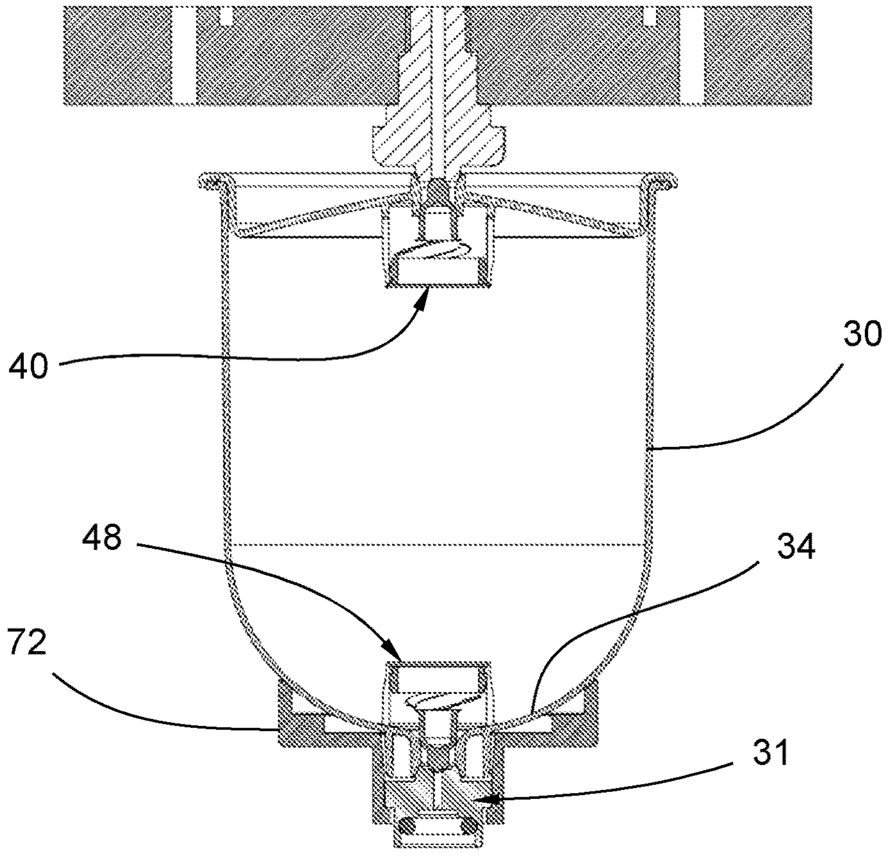
FIG. 32 shows a longitudinal section of a further embodiment of a refilling cartridge according to the invention.
Figure 33:
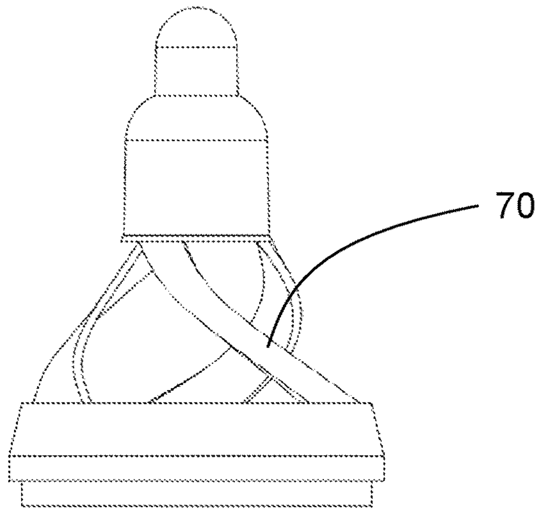
FIG. 33 shows a self closing valve of the refilling cartridge shown in FIG. 32.
Figure 34:
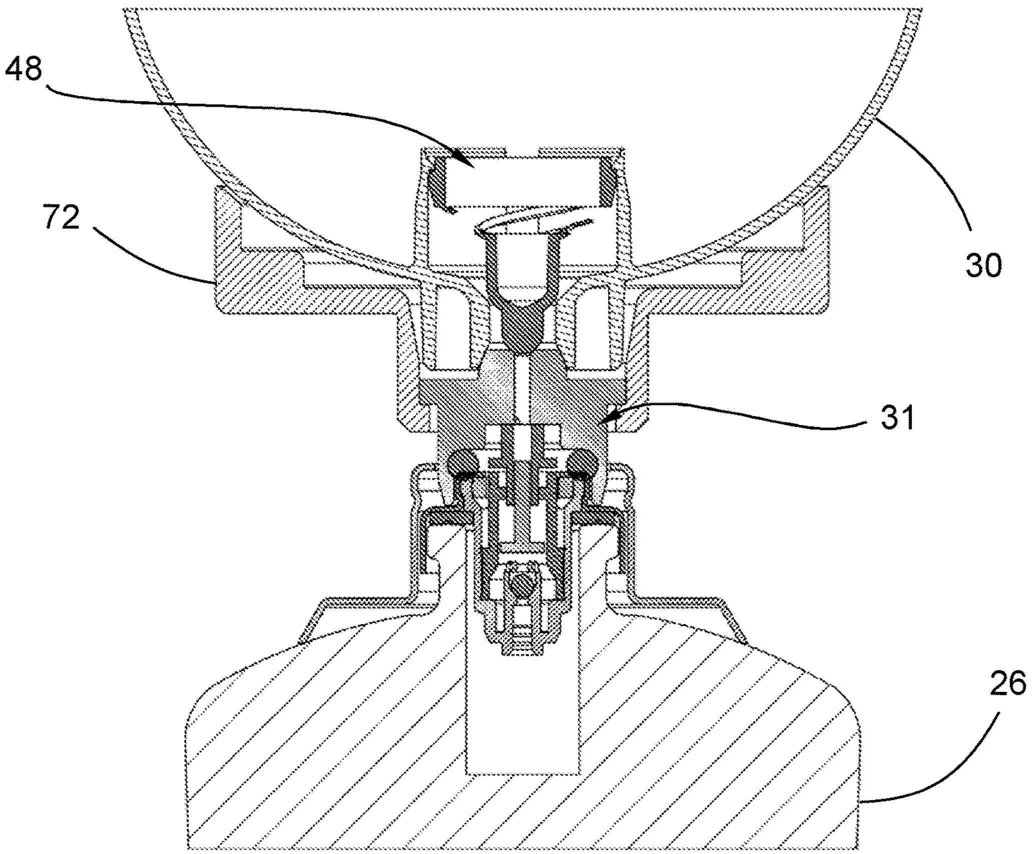
FIG. 34 shows a longitudinal section of the refilling cartridge of FIG. 32 connected to a container by means of connecting means.

FIG. 32 show another refilling cartridge 30 according to the invention. This refilling cartridge 30 is a multidose refilling cartridge 30, i.e. it can be used to refill several containers 26. The refilling cartridge 30 presents an inlet valve 40 and an outlet valve 48. Said inlet valve 40 and outlet valves are self closing valves that comprise a spring 70 and a closing member (see also FIGS. 33 and 34). The spring 70 pushes the closing member against a valve seat, thereby closing a fluid communication between the refilling cartridge 30 and the container 26 to be refilled. This refilling cartridge 30 does not present the stiffening means, therefore, to bear the pressure it is subjected to during its use, the refilling cartridge is placed on an annular ring 72 arranged on the connection means 31. The base 34 of the refilling cartridge 30 sits on the annular ring 72 so forces are better distributed across the refilling cartridge 30.

Figure 35:
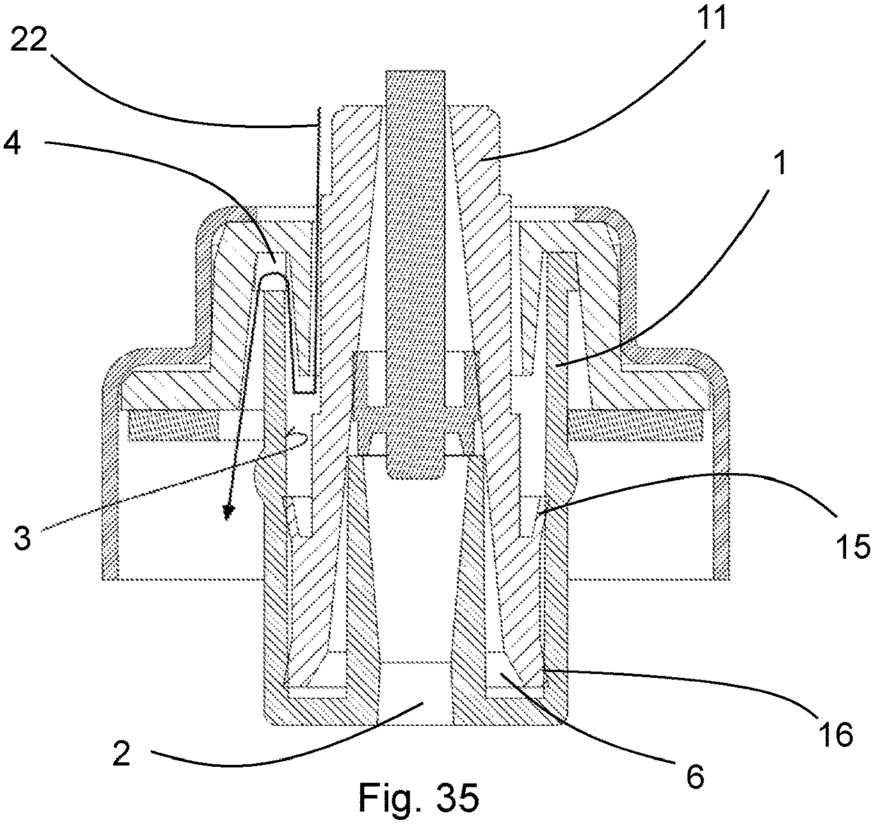
FIG. 35 shows a longitudinal section of another pump of a container according to the invention.
Figure 36:
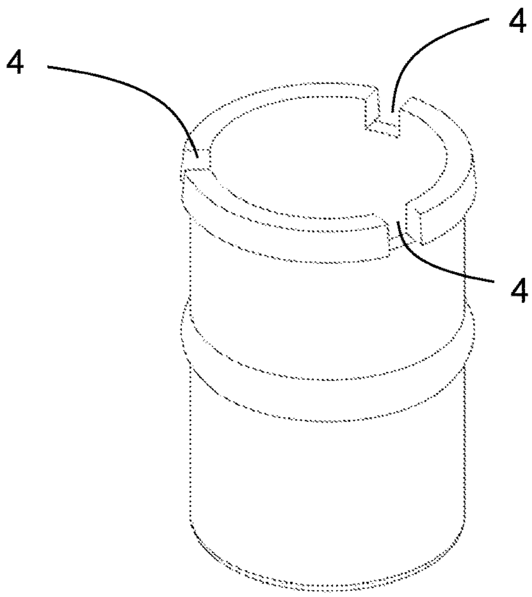
FIG. 36 shows the pump body of the pump shown in FIG. 35.

The container 26 may have also have a different pump, such as the pump shown in FIG. 35. As it can be seen in FIG. 35, this pump has a different fluidic communication pathways. The side port 4 of the pump body is arranged on the top of the pump body (see also FIG. 36). The lower portion of pumping piston 11 comprises an outer side surface 12, facing the inner side surface 3, an upper perimetral sealing lip 15 and a lower perimetral sealing lip 16. During a movement of actuation of the pump, the piston 11 moves according to the axial direction between an expanded position and a retracted position. When the piston 11 is in the retracted position the side port 4 is arranged over the upper perimetral sealing lip 15 and between the piston 11, the pump body 1, and the fixing means there is an air passage 22 (marked with an arrow in FIG. 35) suitable for establishing a fluidic communication between the exterior of the container 26 and the side port 4, and when the piston 11 is in the expanded position, the air passage 22 is closed by the upper perimetral sealing lip 15. In this case, step [2] takes place by moving the piston 11 from the expanded position, thereby opening the air passage 22 and establishing a fluidic communication between the interior of the refilling cartridge 30 and the inner volume 8.

In another embodiment of the invention, the refilling method for refilling a container 26 further comprises an evaluation step [2a] that is performed before previously explained steps [3] and [4]. Moreover, the evaluation step [2a] is not part of the previously explained step [5]. The purpose of performing this evaluation step [2a] is to determine the air volume of a refilling cartridge 30. As refilling cartridges 30 can be used to refill several containers 26, it is important to know the initial air volume of the refilling cartridge 30 that is going to be used to refill the container 26.

Figure 37:
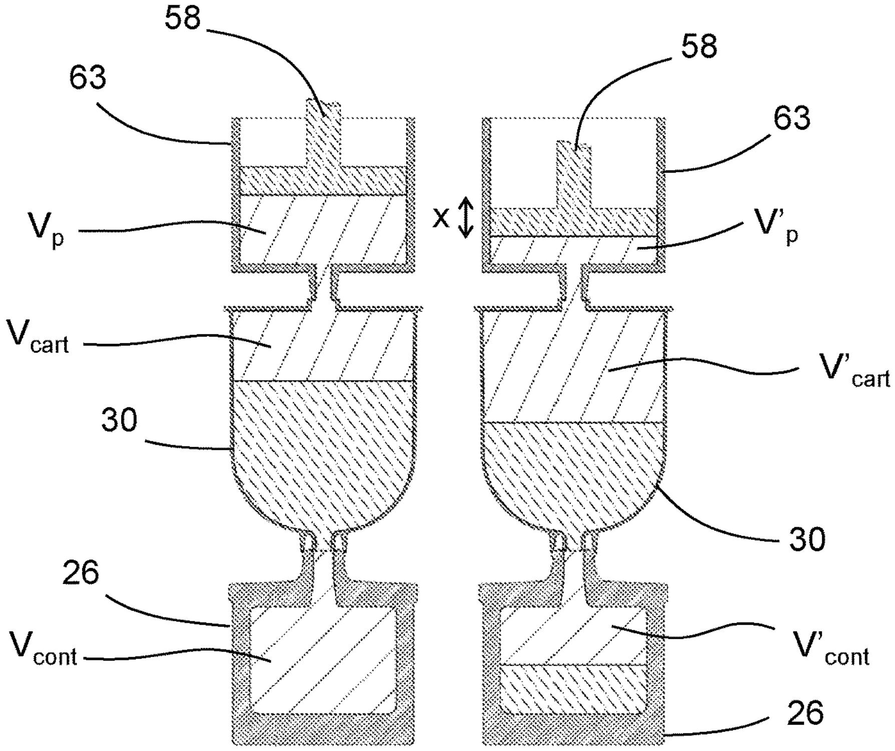
FIG. 37 shows the initial and final air volumes of the system when a container is being refilled.

This refilling method is preferably performed using a compressing piston 58. However, other gas compression means could be used. In each piston cycle, the piston 58 travels the same distance x along its sleeve 63, except for its last piston travel, when the piston travel is smaller. This will be explained later on. If the travel of the piston 58 for each piston cycle is always the same, the equilibrium pressure of the system (piston+refilling cartridge+container) is invariant for any cycle. Equilibrium of the system is reached when there is no more fluid transfer from the refilling cartridge 30 to the container 26. When there is no more fluid transfer, equilibrium is reached. When equilibrium is reached all pressures (piston pressure, refilling cartridge pressure and container pressure) are equal. See FIG. 37.

Figure 38:
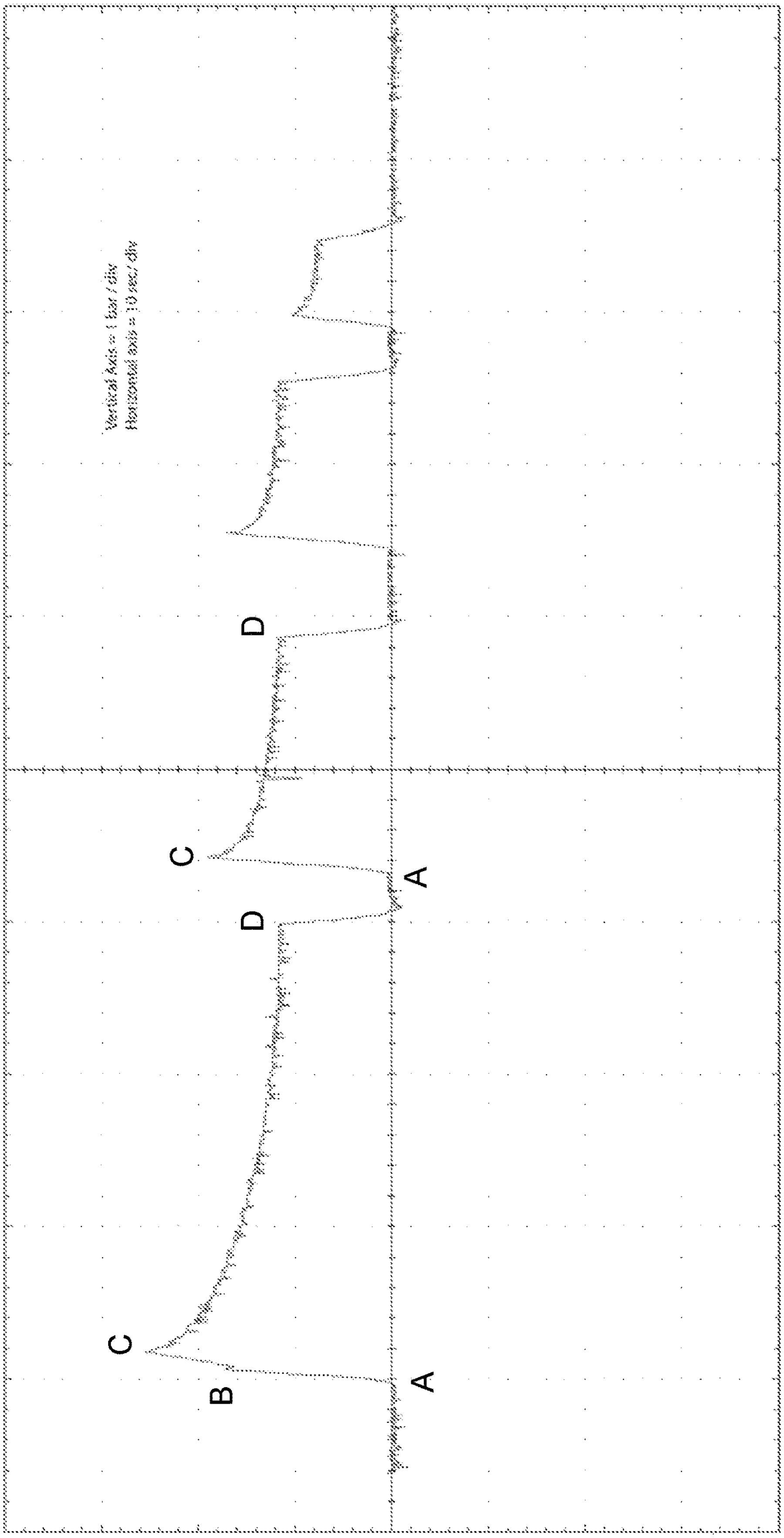
FIG. 38 shows the evolution of pressure during several piston cycles.

FIG. 38 shows a graph with the evolution of pressure during time along several piston cycles. Due to practical reasons, pressure is measured only in the compressing chamber formed by compressing piston 58 and sleeve 63. In each piston cycle the pressure within the compressing chamber is pushed from a certain initial value (point A in the graph), preferably atmospheric pressure, to a maximum pressure (point C of the graph), when the piston has travelled distance x. After this fast pressure increase, the piston remains in its final position. The pressure inside the compressing chamber and the refilling cartridge are the same. The refilling within the refilling cartridge 30 starts to flow to the container. Therefore, the pressure within the refilling cartridge and the compressing chamber drops slowly during the flow of the refilling liquid from the refilling cartridge to the container. Simultaneously, the pressure within the container rises as the refilling liquid flows in the container. At a certain point, the pressure within the container equals the pressure within the refilling cartridge and the compressing chamber. This moment corresponds to point D in the chart. Finally, the piston moves to its initial position (moving back distance x). This provokes the reduction of pressure within compressing chamber and refilling cartridge that allows the flow from compressed gas within the container to the interior of the refilling cartridge and the compressing chamber. At the end, pressure within the compressing chamber, the refilling cartridge and the container reaches the same starting value (point A of the next cycle) as the sum of the three volumes of gas (preferably air) of the three (compressing chamber+refilling cartridge+container) is invariant.

The total air and liquid volume of the whole system (compressing chamber+refilling cartridge+container) is always the same and as the temperature remains constant, Boyle's law can be applied:

$$P(V_p+V_{cart}+V_{cont})=P'(V_p-xS+V'_{cart}+V'_{cont})$$

wherein,

P is the initial pressure, in Pa, $V_p$ is the initial air volume, in $m^3$, within the sleeve 63 that the piston 58 will compress, $V_{cart}$ is the initial air volume, in $m^3$, of the refilling cartridge, $V_{cont}$ is the initial air volume, in $m^3$, of the container 26, P' is the final pressure, in Pa, x is the travel of the piston 58 in m, S is the area of the section of said piston 58 in $m^2$, $V'_{cart}$ is the final air volume, in $m^3$, of the refilling cartridge 30, and $V'_{cont}$ is the final air volume, in $m^3$, of the container 26.

It is understood that "initial" refers to the state where the piston 58 has not performed its stroke (point A of the graph of FIG. 38). So, the initial pressure is the pressure prior starting to increase the pressure to which said refilling liquid in said interior of the refilling cartridge 30 is subjected to, and "final" refers to the state where the piston 58 has performed its stroke and where the pressure is still not decreasing (point D of the graph shown below). So, the final pressure is the pressure prior reducing the pressure to which said refilling liquid in said interior of the refilling cartridge 30 is subjected to. See FIG. 36.

In said evaluation step [2a] the pressure to which said refilling liquid in said interior of the refilling cartridge 30 is subjected to is increased to an evaluation pressure $P_{ev}$ (point B of the graph of FIG. 38). The evaluation step is performed under a fast increase of pressure, so the liquid transfer from the refilling cartridge to the container is negligible. Therefore, this evaluation step [2a] allows to determine the air volume of the refilling cartridge 30 according to the following formula:

$$V_{cart}=\frac{V_p(P-P_{ev})+P_{ev}x_{ev}S}{P_{ev}-P}$$

wherein, $V_{cart}$ is the initial air volume, in ml, of the refilling cartridge 30, $V_p$ is the initial air volume, in $m^3$, within the sleeve 63 that the piston 58 will compress, P is the initial pressure, in Pa, $P_{ev}$ is the evaluation pressure in Pa $x_{ev}$ is the travel of the piston 58 during said evaluation step in m, and S is the area of the section of said piston 58 in $m^2$.

Furthermore, the method also comprises a step of calculating the number of times or cycles that previously explained steps [3] and [4] must be performed in order to completely refill the container 30. Using the following equation for each cycle we can determine the number of cycles that are necessary to refill the container 30:

$$PV_{cont}=P'V'_{cont}$$

wherein,

P is the initial pressure, $V_{cont}$ is the initial air volume within the container, P' is the final pressure, $V'_{cont}$ is the final air volume within the container.

The number of piston strokes, i.e. the number steps [3] and [4] need to be performed, can also be determined using the following formula:

$$n=\frac{\ln(\text{Ratio})}{\ln(P/P')}$$

wherein, n is the number of times steps [3] and [4] will be performed,

P is the initial pressure,

P' is the final pressure, and

Ratio is the ratio between the final air volume of a container 26 to be refilled with respect to the total air volume that the container 26 to be refilled contains when the container 26 is empty. The final air volume is the air volume of the container 26 when it is empty minus the air volume of the liquid within the container 26.

Once the air volume of the refilling cartridge 30 is estimated, the air volume of the container 26 can be determined. This is important because as refilling cartridges 30 can be used to refill several containers 26, the refilling process of the container 26 could start with a partially empty refilling cartridge 30. Furthermore, it is also important to know if the container 26 is also partially or fully empty. Thus, it is possible to determine if the liquid within the refilling cartridge 30 will be enough to refill the container 30. The air volume of the container 26 can be determined as follows:

$$V_{cont} = \frac{P'}{P' - P} xS - V_p - V_{cart}$$

wherein, $V_{cont}$ is the initial air volume, in $m^3$, of the container 26, P is the initial pressure, in Pa, P' is the final pressure, in Pa, $V_p$ is the initial air volume, in $m^3$, within the sleeve 63 that the piston 58 will compress, $V_{cart}$ is the initial air volume, in $m^3$, of the refilling cartridge, x is the travel of the piston 58 in m, S is the area of the section of said piston 58 in $m^2$, So, as an example, to refill a container 26 that has a capacity of 113 ml when it is empty, with 100 ml of liquid, knowing that the initial pressure is 1 bar and the final pressure is 2 bar (both absolute):

$$PV_{cont} = P' V'_{cont}$$

$$V'_{cont} = \frac{PV_{cont}}{P'} \rightarrow V'_{cont} = \frac{1 \cdot 113}{2} = 56.5 \text{ ml}$$

Following the same equation for each cycle:

| Cycle | Air within the container (ml) | Liquid within the container (ml) | Pending liquid (ml) |
|---|---|---|---|
| Initial state | 113 | 0 | 100 |
| 1 | 113/2 = 56.5 | 113 − 56.5 = 56.5 | 100 − 56.5 = 43.5 |
| 2 | 56.5/2 = 28.25 | 113 − 28.25 = 84.75 | 100 − 84.75 = 15.25 |
| 3 | 28.5/2 = 14.125 | 113 − 14.125 = 98.9 | 100 − 98.9 = 1.1 |
| 4 | 14.125/2 = 7.06 | 113 − 7.06 = 105.94 | 100 − 105.94 = −5.94 |

Therefore, cycle number 4 will be fractional and the piston 58 travel will have to be 1.1/7.06=15.5% of the previous travel. This is, the piston 58 will perform 3 strokes at the same travel and 1 stroke at 15.5% of the travel. So, the piston 58 will perform a number of complete strokes equal to the integer part of n, and an additional, shorter, stroke corresponding to the fractional component of n.

As previously said, the number of cycles or times that steps [3] and [4] must be performed to refill a container 26 can also be determined as follows:

$$n = \frac{\ln(\text{Ratio})}{\ln(P/P')} = \frac{\ln((113 - 100)/113)}{\ln(1/2)} = 3.12$$

The invention claimed is:

1. Method for refilling a container, wherein said container has a neck, a bottom, and an inner volume, wherein said container has a dispensing pump assembled on said neck, wherein said pump comprises:

[a] a pump body with:

[a.1] a lower inlet port,

[a.2] a cylindrical inner side surface defining an axial direction,

[a.3] a side port arranged on said inner side surface, and

[a.4] an upper opening, wherein the pump body defines a pumping chamber in the interior thereof, wherein when the pump is in an assembled position, said upper opening protrudes from said neck and said lower inlet port is inside said container, and said side port communicates said inner side surface with said inner volume,

[b] an inlet valve arranged between said lower inlet port and said pumping chamber, suitable for allowing the entry of liquid in the interior of said pumping chamber through said lower inlet port and for blocking the exit of liquid in the interior of said pumping chamber through said lower inlet port,

[c] a suction tube having one end connected to said lower inlet port and extending towards said bottom,

[d] a piston with

[d.1] a lower portion housed inside said pump body and comprising

[d.1.1] an outer side surface, facing said inner side surface,

[d.1.2] an upper perimetral sealing lip,

[d.1.3] a lower perimetral sealing lip,

[d.2] and an upper portion with evacuation means comprising an outlet port and an outlet valve, arranged between said outlet port and said pumping chamber, suitable for allowing the exit of liquid from the interior of said pumping chamber through said outlet port and for blocking the entry of air in the interior of said pumping chamber through said outlet port,

[e] elastic means suitable for generating a force in said axial direction and prone to separating said piston from said pump body, and

[f] fixing means for fixing said pump in said neck, wherein, during a movement of actuation of said pump, said piston moves according to said axial direction between an expanded position and a retracted position, wherein when said piston is in said retracted position, said side port is arranged over said upper perimetral sealing lip and in between said piston, said pump body, and said fixing means, and wherein there is an air passage suitable for establishing a fluidic communication between the exterior of said container and said side port, and when said piston is in said expanded position, said air passage is closed by said upper perimetral sealing lip wherein the method further comprises the following steps:

[1] positioning said container such that said bottom is in the lower position, and fluidically connecting the interior of a refilling cartridge comprising a refilling liquid with said air passage,

[2] moving said piston from said expanded position, thereby opening said air passage and establishing a fluidic communication between said interior of said refilling cartridge and said inner volume,

[3] increasing the pressure to which said refilling liquid in said interior of the refilling cartridge is subjected, thereby causing the passage of part of said liquid to said inner volume, thereby increasing the pressure in said inner volume,

[4] reducing the pressure to which said refilling liquid in said interior of the refilling cartridge is subjected to a value less than the pressure in said inner volume, thereby allowing part of the air under pressure in said inner volume to pass to said interior of the refilling cartridge through said air passage,

[5] repeating steps [3] and [4] at least once,

[6] disconnecting said refilling cartridge.

2. Method according to claim 1, wherein the method further comprises an evaluation step [2a] in which the pressure to which said refilling liquid in said interior of the refilling cartridge is subjected to is increased to an evaluation pressure (Pev), said evaluation step being performed before steps [3] and [4] and not being part of step [5].

3. Method according to claim 1, wherein said increase and decrease of pressure to which said refilling liquid in said interior of the refilling cartridge is subjected to is performed by means of a piston, said piston being able to travel within a sleeve.

4. Method according to claim 3, wherein said evaluation step [2a] is performed to determine the air volume of said refilling cartridge according to the following formula:

$$V_{cart} = \frac{V_p(P - P_{ev}) + P_{ev} x_{ev} S}{P_{ev} - P}$$

wherein, $V_{cart}$ is the air volume, in $m^3$, of the refilling cartridge, $V_p$ is the air volume, in $m^3$, within said sleeve that said piston will compress, P is the initial pressure, in Pa, which is the pressure prior starting to increase the pressure to which said refilling liquid in said interior of the refilling cartridge is subjected to, $P_{ev}$ is said evaluation pressure in Pa $x_{ev}$ is the travel of said piston during said evaluation step in m, and S is the area of the section of said piston in $m^2$.

5. Method according to claim 3, wherein the methodfurther comprises a step of calculating the number of times steps [3] and [4] will be performed using the following formula:

$$n = \frac{\ln(\text{Ratio})}{\ln(P/P')}$$

wherein, n is the number of times steps [3] and [4] will be performed,

P is the initial pressure, which is the pressure prior starting to increase the pressure to which said refilling liquid in said interior of the refilling cartridge is subjected to, P' is the final pressure, which is the pressure prior reducing the pressure to which said refilling liquid in said interior of the refilling cartridge is subjected to, and Ratio is the ratio between the final air volume of a container to be refilled with respect to the total air volume that said container to be refilled contains when said container is empty.

6. The method according to claim 1, wherein said refilling cartridge comprises an individualized identifier for each refilling cartridge, and in that said method comprises a verification step by a user to verify said individualized identifier of said full refilling cartridge, which is performed prior to fluidically connecting the interior of said refilling cartridge comprising a refilling liquid with said air passage.

7. The method according to claim 6, wherein said method is performed by means of a machine comprising a reader of said individualized identifier and communication means suitable for establishing communication with a verifying entity of said individualized identifier, and said verification step is performed automatically by said machine.

8. Machine for performing a method according to claim 1, wherein the machine comprises:

a housing for housing said container with said bottom oriented downwards, connection means for connecting a refilling cartridge to said container, establishing a fluidic communication between the interior of said refilling cartridge and said air passage, said refilling cartridge being for refilling a container and being suitable for housing a liquid to be refilled in said container in the interior of said refilling cartridge, said refilling cartridge comprising a side wall, a base, an upper portion, an inlet with an inlet valve arranged in said upper portion, and an outlet arranged on said base, pressurizing means for increasing the pressure in said interior of said refilling cartridge above atmospheric pressure, depressurizing means for reducing the pressure in said interior of said refilling cartridge, and control means for performing at least two pressurizing and depressurizing cycles one after the other and automatically.

9. The machine according to claim 8, wherein said connection means comprise, in the upper portion thereof, opening means of an outlet arranged at said base of said refilling cartridge.

10. The machine according to claim 8, wherein said connection means comprise, in their lower portion, a support surface suitable for moving said piston and a closure surface suitable for being supported on said pump and forming a sealed closure between said air passage and the exterior.

11. The machine according to claim 8, wherein said connection means further comprise an annular ring for supporting said base of said refilling cartridge.

12. The machine according to claim 8, wherein it comprises a reader for reading said individualized identifier and communication means suitable for establishing communication with a verifying entity of said individualized identifier.

13. The machine according to claim 8, wherein said control means comprises means for executing said evaluation step [2a].

14. The machine according to claim 8, wherein said pressurizing means comprises a piston and a sleeve, said piston being able to travel within said sleeve.

15. The machine according to claim 14 wherein said control means comprises means for determining the air volume of said refilling cartridge according to the following formula:

$$V_{cart} = \frac{V_p(P - P_{ev}) + P_{ev} x_{ev} S}{P_{ev} - P}$$

wherein, $V_c$ is the air volume, in $m^3$, of the refilling cartridge, $V_p$ is the air volume, in $m^3$, within said sleeve that said piston will compress, P is the initial pressure, in Pa, which is the pressure prior starting to increase the pressure to which said refilling liquid in said interior of the refilling cartridge is subjected to, $P_{ev}$ is said evaluation pressure in Pa $x_{ev}$ is the travel of said piston during said evaluation step in m, and S is the area of the section of said piston in $m^2$.

16. The machine according to claim 8, wherein said control means comprises means for calculating the number of times steps [3] and [4] will be performed using the following formula:

$$n = \frac{\ln(\text{Ratio})}{\ln(P/P')}$$

Wherein, n is the number of times steps [3] and [4] will be performed,

P is the initial pressure, which is the pressure prior starting to increase the pressure to which said refilling liquid in said interior of the refilling cartridge is subjected to, P' is the final pressure, which is the pressure prior reducing the pressure to which said refilling liquid in said interior of the refilling cartridge is subjected to, and Ratio is the ratio between the final air volume of a container to be refilled with respect to the total air volume that said container to be refilled contains when said container is empty.

* * * * *